(12) United States Patent
Almeida

(10) Patent No.: US 9,460,459 B2
(45) Date of Patent: Oct. 4, 2016

(54) METHOD OF PLUG-IN CONTENT HOSTING

(75) Inventor: John Almeida, Berkeley, CA (US)

(73) Assignee: UNOWEB VIRTUAL, LLC, Plano, TX (US)

( * ) Notice: Subject to any disclaimer, the term of this patent is extended or adjusted under 35 U.S.C. 154(b) by 1846 days.

(21) Appl. No.: 11/932,774

(22) Filed: Oct. 31, 2007

(65) Prior Publication Data

US 2008/0052615 A1 Feb. 28, 2008

Related U.S. Application Data

(62) Division of application No. 10/029,073, filed on Dec. 20, 2001.

(51) Int. Cl.
*G06F 17/00* (2006.01)
*G06Q 30/06* (2012.01)
*G06F 17/22* (2006.01)
*G06F 17/30* (2006.01)

(52) U.S. Cl.
CPC ........... *G06Q 30/06* (2013.01); *G06F 17/2235* (2013.01); *G06F 17/2247* (2013.01); *G06F 17/30873* (2013.01); *G06Q 30/0601* (2013.01); *G06Q 30/0613* (2013.01); *G06Q 30/0621* (2013.01); *G06Q 30/0633* (2013.01); *G06Q 30/0641* (2013.01); *G06Q 30/0643* (2013.01)

(58) Field of Classification Search
CPC ..................... G06F 17/2247; G06F 17/30887; G06F 17/30014; G06F 17/30882; G06F 17/30873; G06F 17/2235; G06Q 30/06; G06Q 30/0601; G06Q 30/0613; G06Q 30/0621; G06Q 30/0633; G06Q 30/0641; G06Q 30/0643

USPC ........................ 715/205, 234, 749, 760, 255; 705/26–29, 26.1, 27.1
See application file for complete search history.

(56) References Cited

U.S. PATENT DOCUMENTS

| | | | |
|---|---|---|---|
| 5,897,622 A | | 4/1999 | Blinn et al. |
| 5,966,697 A | * | 10/1999 | Fergerson et al. .............. 705/17 |
| 5,970,472 A | * | 10/1999 | Allsop et al. ............... 705/26.81 |
| 6,490,602 B1 | * | 12/2002 | Kraemer ...................... 715/236 |
| 6,598,026 B1 | | 7/2003 | Ojha et al. |
| 6,643,661 B2 | * | 11/2003 | Polizzi et al. ................ 707/709 |
| 6,754,636 B1 | | 6/2004 | Walker et al. |
| 6,754,672 B1 | * | 6/2004 | McLauchlin |
| 6,868,394 B1 | * | 3/2005 | Mele .......................... 705/26.81 |

(Continued)

FOREIGN PATENT DOCUMENTS

WO WO 01/13273 A2 2/2001

OTHER PUBLICATIONS

Rick Greenwald et al, "Oracle Essentials: Oracle9i, Oracle8i and Oracle8, Second Edition", O'Reilly Media, Inc., Jun. 12, 2001, chapter 14.*

(Continued)

*Primary Examiner* — Thu Huynh
(74) *Attorney, Agent, or Firm* — Louis Ventre, Jr.

(57) ABSTRACT

A method of presentation in a network for the display of virtual content by a server computer comprising steps of hosting content hosts or websites on the network, wherein each content host is flexibly configured to enable another content host to be virtually incorporated into any other content host while preserving the composition of the content and the behavior of display of the content that is virtually displayed.

7 Claims, 41 Drawing Sheets

(56) References Cited

U.S. PATENT DOCUMENTS

| | | |
|---|---|---|
| 7,013,290 B2 | 3/2006 | Ananian |
| 7,039,603 B2 | 5/2006 | Walker et al. |
| 7,039,656 B1* | 5/2006 | Tsai et al. |
| 7,249,056 B1 | 7/2007 | Crouthamel et al. |
| 7,333,949 B2 | 2/2008 | Shimizu et al. |
| 7,395,223 B1* | 7/2008 | Buzzell et al. ............ 705/26.44 |
| 7,574,381 B1* | 8/2009 | Lin-Hendel ................ 705/27 |
| 7,613,659 B1* | 11/2009 | Hoffman et al. ............... 705/44 |
| 8,150,736 B2 | 4/2012 | Horn et al. |
| 2001/0042016 A1 | 11/2001 | Muyres et al. |
| 2001/0047387 A1* | 11/2001 | Brockhurst ................ 709/203 |
| 2001/0056377 A1* | 12/2001 | Kondoh et al. ............. 705/26 |
| 2001/0056405 A1 | 12/2001 | Muyres et al. |
| 2002/0087690 A1* | 7/2002 | Hepper et al. ............... 709/225 |
| 2002/0091639 A1* | 7/2002 | Mandahl et al. ............ 705/50 |
| 2002/0091726 A1* | 7/2002 | MacLeod Beck et al. ................ 707/501.1 |
| 2002/0138346 A1* | 9/2002 | Kodaka et al. ............. 705/14 |
| 2002/0152131 A1* | 10/2002 | Lee .............................. 705/26 |
| 2002/0156685 A1 | 10/2002 | Ehrlich et al. |
| 2002/0194267 A1* | 12/2002 | Flesner et al. ............. 709/203 |
| 2003/0033371 A1* | 2/2003 | Ueno ........................ 709/206 |
| 2003/0078927 A1* | 4/2003 | Hammond et al. ........... 707/10 |
| 2003/0093321 A1 | 5/2003 | Bodmer et al. |
| 2003/0154135 A1* | 8/2003 | Covington et al. ........... 705/26 |
| 2004/0205555 A1* | 10/2004 | Hind et al. ................. 715/513 |
| 2006/0136309 A1 | 6/2006 | Horn et al. |
| 2008/0040240 A1* | 2/2008 | Covington et al. ........... 705/27 |
| 2010/0005009 A1* | 1/2010 | Lin-Hendel ................ 705/27 |

OTHER PUBLICATIONS

USPTO, Office communication on U.S. Appl. No. 10/029,073, filed Dec. 20, 2001, applicant John Almeida, mailed Jun. 7, 2012, Alexandria, Virginia.

* cited by examiner

Fig. 13

DynamicTable

| ID | Shop_Name | Mall_Name | Department | Category | Subcategory | Product_ID |
|---|---|---|---|---|---|---|
| 1 | E-Shop A-2 | E-Mall A | Department A-2 | Category A-2 | Sub-category A-2 | Product A-2-1 |
| 2 | E-Shop A-2 | E-Mall A | Department A-2 | Category A-2 | Sub-category A-2 | Product A-2-2 |
| 3 | E-Shop A-2 | E-Mall A | Department A-2 | Category A-2 | Sub-category A-2 | Product A-2-3 |
| 4 | E-Shop B-1 | E-Mall B | Department B-1 | Category B-1 | Sub-category B-1 | Product B-1-1 |
| 5 | E-Shop B-1 | E-Mall B | Department B-1 | Category B-1 | Sub-category B-1 | Product B-1-2 |
| 6 | E-Shop B-1 | E-Mall B | Department B-1 | Category B-1 | Sub-category B-1 | Product B-1-3 |
| 7 | E-Shop B-3 | E-Mall B | Department B-3 | Category B-3 | Sub-category B-3 | Product B-3-1 |
| 8 | E-Shop B-3 | E-Mall B | Department B-3 | Category B-3 | Sub-category B-3 | Product B-3-2 |
| 9 | E-Shop B-3 | E-Mall B | Department B-3 | Category B-3 | Sub-category B-3 | Product B-3-3 |
| 10 | E-Shop C-2 | E-Mall C | Department C-2 | Category C-2 | Sub-category C-2 | Product C-2-1 |
| 11 | E-Shop C-2 | E-Mall C | Department C-2 | Category C-2 | Sub-category C-2 | Product C-2-2 |
| 12 | E-Shop C-2 | E-Mall C | Department C-2 | Category C-2 | Sub-category C-2 | Product C-2-3 |

Fig. 14

VirtualTable

| ID | Virtual_Mall | Type | Virtual_Type_Name |
|---|---|---|---|
| 1 | E-Mall A | Product | Product C-2-1 |
| 2 | E-Mall A | Product | Product C-2-2 |
| 3 | E-Mall A | Product | Product C-2-3 |
| 4 | E-Mall B | Shop | E-Shop A-2 |
| 5 | E-Shop B-3 | Shop | E-Shop B-1 |
| 6 | E-Mall C | Shop | E-Shop B-3 |
| 7 | E-Mall C | Department | Department A-2 |
| 8 | E-Mall C | Category | Category A-2 |
| 9 | E-Mall C | Sub-category | Sub-category A-2 |

Fig. 16 languageTable

| ID | Phrase_Code | ENG | POR |
|---|---|---|---|
| 1 | NAME | Name | Nome |
| 2 | ADDR | Address | Endereço |
| 3 | CITY | City | Cidade |
| 4 | STAT | State | Estado |
| 5 | ZIP | Zip Code | Código Postal |
| 6 | CNTY | Country | País |
| 7 | ENGL | English | Inglês |
| 8 | PORT | Portuguese | Português |

Fig. 17

| ENG | English |
|---|---|
| POR | Portuguese |

Hidden Elements     drop down choices

Fig. 18

```
1) <!-- only form tags are used, all other HTML tags omitted for simplicity -->
2) <form name=changelanguage action=newlanguage.asp>
3)      <select name=language onChange='changeLanguage()'>
4)          <option value=ENG>English</option>
5)          <option value=POR>Portuguese</option>
6)      </select>
7) </form>
8)
9) <script language=javascript>
10)     function changeLanguage()
11)     {
12)         document.changelanguage.submit();
14)     }
15) </script>
```

Fig. 19

```
1)  <% var sLanguage=Request.Form("language");
2)
3)  function doTranslate(sPhraseCode,sChosenLanguage)
4)  {
5)  //
6)  // code to open Data Base Connection and Record Set Connection
7)  //
8)  var Connect = Server.CreateObject("ADODB.Connection");
9)  // name of Data Base where translation table is located
10) // assumed "worldTranslation" for sake of simplicity
11) Connect.Open( "worldTranslation" );
12)
13) var languageRS = Server.CreateObject("ADODB.Recordset");
14) // name of table is assumed to be "languageTable"
15) // for sake of symplicity
16) var Query = "SELECT " + sChosenLanguage + " FROM languageTable WHERE "
17)         + " Phrase_Code='" + sPhraseCode + "'";
18)
19) languageRS .Open( Query, Connect , 3, 3 );
20) return( languageRS (sChosenLanguage) );
21) }
22)
23) //
24) // code to close connection go here
25) // omitted for symplicity
26) // %>
27) <!-- not all HTML tags will be used, omitted for symplicity -->
28) <html>
29) <form name=changelanguage action=newlanguage.asp>
30)     <select name=language onChange='changeLanguage()'>
31)             <option value=ENGL>
32)                     <% Response.Write(doTranslate("ENGL", sLanguage)) %>
33)             </option>
34)             <option value=PORT>
35)                     <% Response.Write(doTranslate("PORT", sLanguage)) %>
36)             </option>
37)     </select>
38) </form>
39) </html>
40) <script language=javascript>
41)     function changeLanguage()
42)     {
43)             document.changelanguage.submit();
44)     }
45) </script>
```

Fig. 20

| ID | Product_ID | Language | Product_Title |
|---|---|---|---|
| 1 | Product A-2-1 | POR | Titulo do Produto A-2-1 |
| 2 | Product A-2-2 | ENG | Product A-2-2 Title |

Fig. 21

DynamicTable2

| ID | Language | Shop_Name | Mall_Name | Department | Category | Subcategory | Product_Title |
|---|---|---|---|---|---|---|---|
| 1 | POR | E-Shop A-2 | E-Mall A | Department A-2 | Category A-2 | Subcategory A-2 | Título do Produto A-2-1 |
| 2 | ENG | E-Shop A-2 | E-Mall A | Department A-2 | Category A-2 | Subcategory A-2 | Product Title A-2-2 |
| 3 | ENG | E-Shop A-2 | E-Mall A | Department A-2 | Category A-2 | Subcategory A-2 | Product Title A-2-3 |
| 4 | POR | E-Shop B-1 | E-Mall B | Department B-1 | Category B-1 | Subcategory B-1 | Título do Produto B-1-1 |
| 5 | ENG | E-Shop B-1 | E-Mall B | Department B-1 | Category B-1 | Subcategory B-1 | Product Title B-1-2 |
| 6 | ENG | E-Shop B-1 | E-Mall B | Department B-1 | Category B-1 | Subcategory B-1 | Product Title B-1-3 |
| 7 | POR | E-Shop B-3 | E-Mall B | Department B-3 | Category B-3 | Subcategory B-3 | Título do Produto B-3-1 |
| 8 | ENG | E-Shop B-3 | E-Mall B | Department B-3 | Category B-3 | Subcategory B-3 | Product Title B-3-2 |
| 9 | ENG | E-Shop B-3 | E-Mall B | Department B-3 | Category B-3 | Subcategory B-3 | Product Title B-3-3 |
| 10 | POR | E-Shop C-2 | E-Mall C | Department C-2 | Category C-2 | Subcategory C-2 | Título do Produto C-2-1 |
| 11 | ENG | E-Shop C-2 | E-Mall C | Department C-2 | Category C-2 | Subcategory C-2 | Product Title C-2-2 |
| 12 | ENG | E-Shop C-2 | E-Mall C | Department C-2 | Category C-2 | Subcategory C-2 | Product Title C-2-3 |

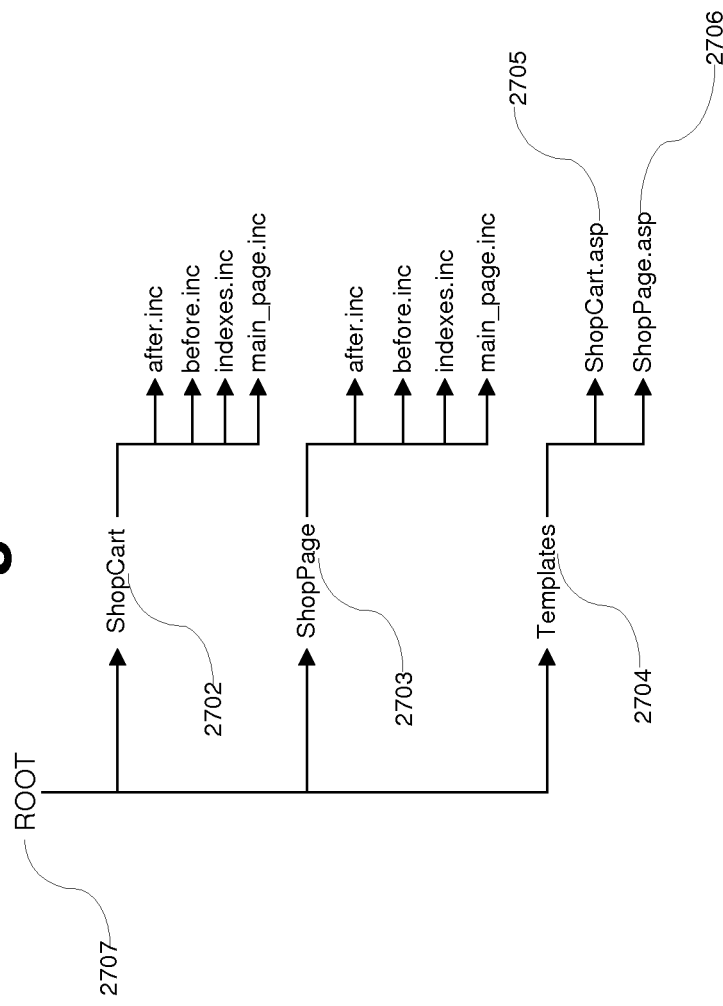

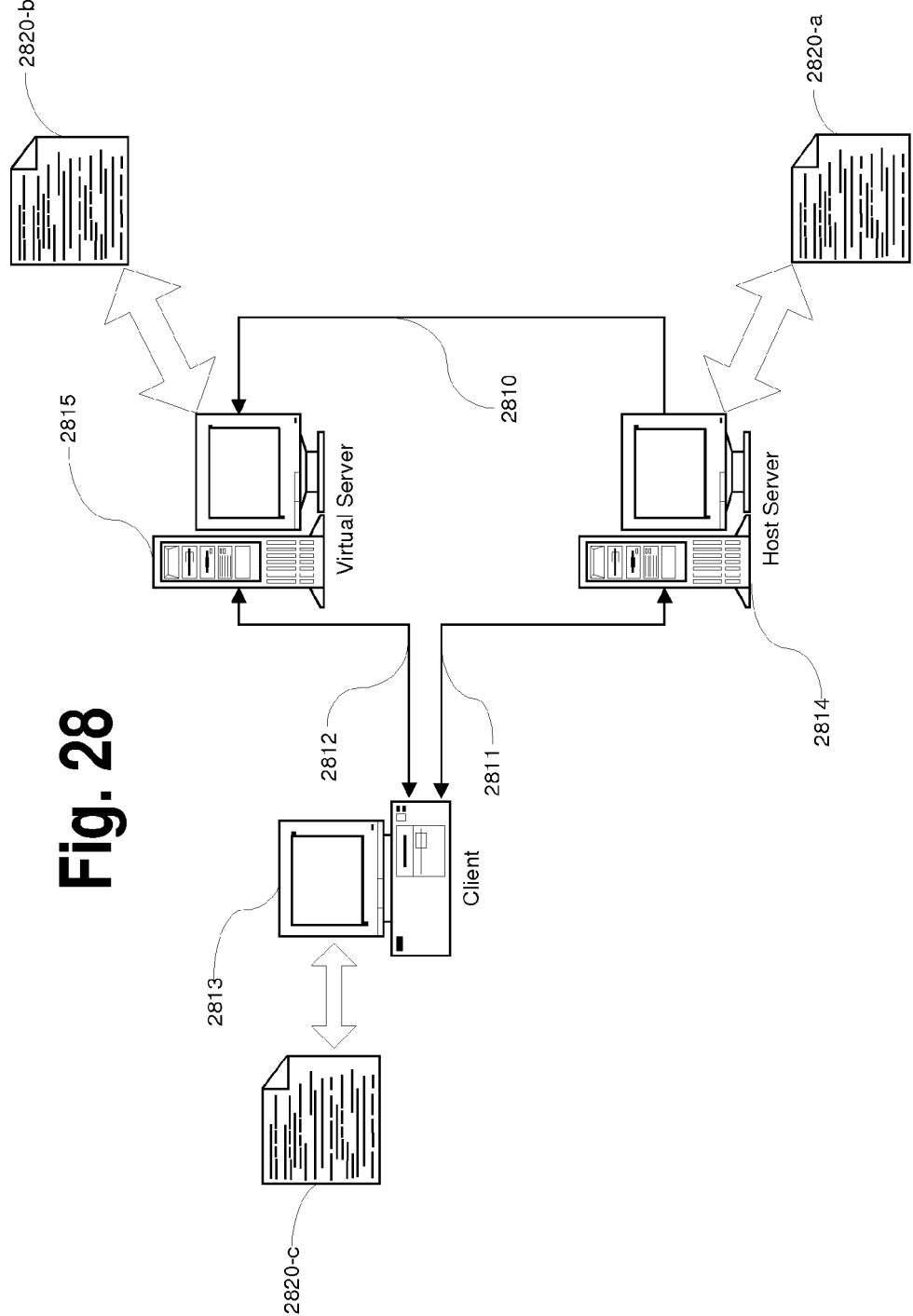

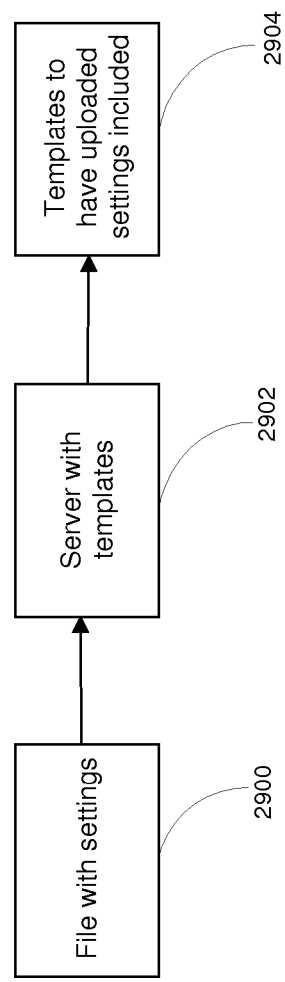

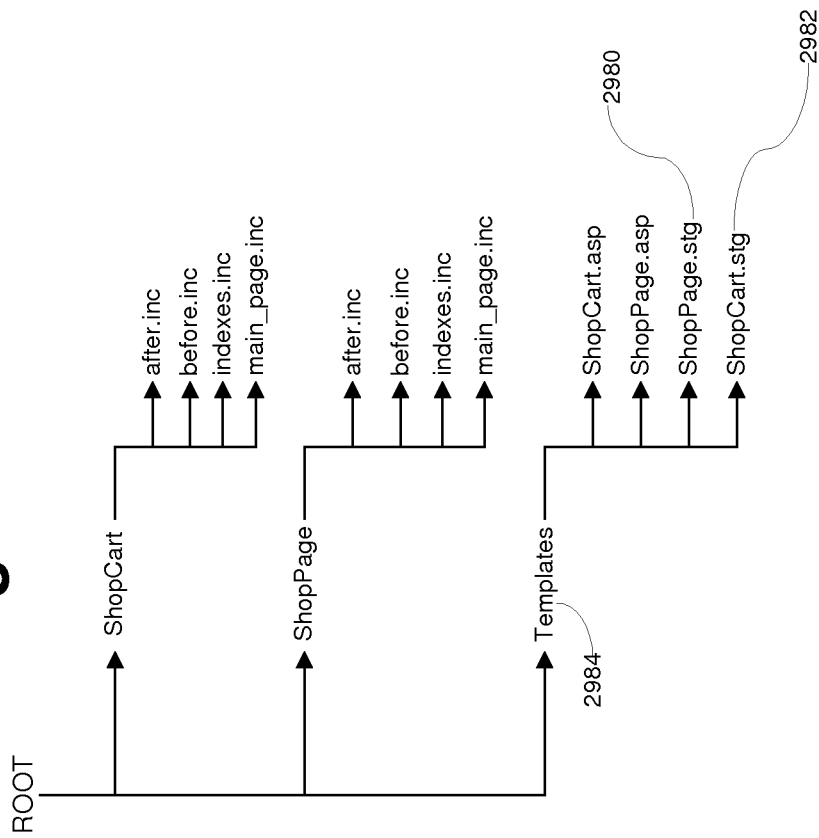

METHOD OF PLUG-IN CONTENT HOSTING

CROSS REFERENCE TO RELATED APPLICATION

The present application is a divisional of and claims priority of U.S. patent application Ser. No. 10/029,073, filed on Dec. 20, 2001; title "A METHOD FOR CREATING AND MAINTAINING WORLDWIDE E-COMMERCE"; the content of which is hereby incorporated by reference in its entirety.

BACKGROUND OF INVENTION

1. Field of the Invention

The field of this invention relates to a virtual network of e-commerce e-malls, satellite e-malls, e-shops, e-distributors and web sites. More specifically, the present invention relates means for creating and maintaining worldwide e-malls and each of these e-malls will offer means for creating e-shops, e-distributors and web sites without the need of an e-commerce infrastructure or even a web server.

2. Prior Art

The Internet has a tremendous potential with its worldwide reach; also, there are a lot of challenges and opportunities. At the present, there are needs for easy and affordable worldwide e-commerce solutions where seller can have their goods and services sold without the expertise or the expenses that today's e-commerce requires.

Today's e-commerce web sites henceforth called e-shop(s) are of a dynamic type with products and/or services that are available to a broad base of buyers. One good example of a dynamic e-shop is Amazon.com.

One other type of e-commerce setup is the e-shopping mall where dynamic e-shops are created and updated directly by a user and henceforth called e-mall(s). The four most popular are: VStore.com, ViaWeb.com, Bcentral.com and BigStep.com.

Stores in these e-malls are treated as independent dynamic e-shops with specific URL (Uniform Resource Locator) addresses and their products/services are only available within their closed environment. Thus, products/services cannot be shared among other e-malls or e-shops even within their own network of dynamic e-shops at the e-mall.

Except VStore.com where all e-shop virtually sells products from distributors.

The dynamic e-mall setup does not enhance the shopping experience nor facilitates the interaction between buyer and seller. Since a buyer will have to move from e-shop to e-shop in the e-mall. Time is thus wasted and sales can be lost. Furthermore, the dynamic e-mall concept cannot be created without an elaborate and expensive e-commerce infrastructure that requires extensive knowledge and expertise.

Currently, dynamic e-mall will not allow the creation of specialized e-shops that can sell their products/services in conjunction with similar products/services from others e-shops.

Today's e-commerce requires solutions where seller can have their products/services available to a broad base of buyers, also, virtually available to other e-shops, satellite e-malls and e-malls where they will be offered to a broader clientele base. For this to be possible, the process for creating and updating e-malls, satellite e-malls, e-shops, e-distributors and web sites must be on-line and easy to setup and use.

Buyers on the other hand, need a solution where they will have a broad selection without having to go to many different e-shops to find what they're looking for, and also be able to view web pages in their own native language.

It is the object of this invention to offer easy and affordable e-commerce solution worldwide with a single e-commerce and e-services resource infrastructure as to allow anyone anywhere in the world to provide e-commerce solution without the need of an e-commerce infrastructure or even an Internet server.

SUMMARY OF THE INVENTION

It is the object of this invention to demonstrate a virtual electronic shopping mall where on-line users can create and update e-malls which in turn offers others the ability to host e-shops and web sites offering products/services. Also, an e-mall will have means for customizing a satellite e-mall and means for hosting pre-set ones. Moreover, this invention will allow creating and maintaining of the dynamic e-mall concept without the need of an e-commerce infrastructure or even the need of a web server.

It will further have the ability to exchange interfaces uploaded by a user or allow the user to select one provided by the virtual network (the host computer with the technology infrastructure).

Also, the ability to display interfaces in more than one foreign language for: e-malls, satellite e-malls, e-shops, e-distributors and web sites. All e-malls, satellite e-malls, e-shops, e-distributors and web sites are within a network where products and services can be shared among any e-mall, satellite e-malls, e-shop or web site by making them virtual.

For instance, an e-shop can sell its products dynamically, or have other e-malls; satellite e-malls and e-shops in the virtual network selling them virtually. The advantage of this virtual electronic network environment is to make products and services available to a broader base for both, sellers and buyers.

The virtual electronic network environment will enhance the way people shop electronically. Thus, making a wider selection of products and services available to any e-mall, satellite e-mall, e-shop and web site within the virtual network. It will offer means for the creation of specialized e-shops, satellite e-malls, e-malls and web sites, tailored uniquely to a specific market segment. Further, it will simplify buyers' decision by offering them a broad and specialized selection of products/services.

It is also the intent of this invention to permit users to include e-commerce at web sites that are already in use. Thus, offering a new way to enhance them without the cost of providing the e-commerce infrastructure that is required, or even having to install and maintain a web server.

It will further permit the creation of virtual web sites, other than shopping. For instance, a web site may be virtual on-line schools, cities, etc. The use of this invention is without limits, and, as more goods/services are offered, the more it will allow the creation of a virtual shopping and non-shopping web sites and a combination of both.

It will also integrate the world by allowing an e-shop in one country to sell in another country or to cross-sell products from a distributor or a manufacturer and having them delivered directly to the buyer, thus reducing storage, shipping and handling cost.

BRIEF DESCRIPTION OF THE DRAWINGS

The accompanying drawings, which are incorporated in the form a part of this specification, illustrate embodiments of the invention and, together with the description, serve to explain the principles of the invention:

FIG. 13 illustrates a dynamic database table that represents the illustration of FIG. 11.

FIG. 14 illustrates a virtual database table that represents the illustration of FIG. 12.

FIG. 16 illustrates a database table to be used to translate web page text objects into multiple foreign languages.

FIG. 17 illustrates a web page drop down elements.

FIG. 18 illustrates the source code for the web page drop down of FIG. 17.

FIG. 19 illustrates an ASP program to be used to translate web page database text objects.

FIG. 20 illustrates a database table with products in multiple foreign languages.

FIG. 21 illustrates a database table with database table's object in multiple foreign language.

FIG. 27 illustrates folders for the include files of FIG. 26.

FIG. 28 illustrates a client receiving an interface from multiple servers.

FIG. 29 illustrates a method of uploading a file with settings to the virtual network server.

FIG. 29a illustrates two files with settings in a folder for each template.

DESCRIPTION OF THE PREFERRED EMBODIMENTS

Figure 1:
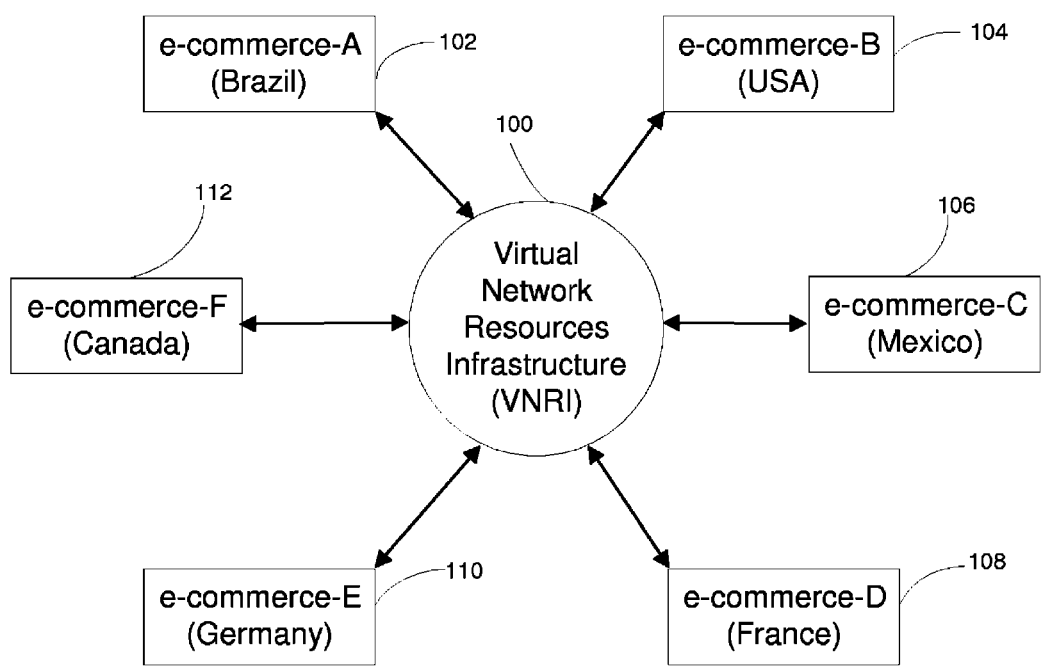
FIG. 1 illustrates a worldwide e-commerce sharing a single e-commerce resource infrastructure.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, a virtual network, or a computer program product. Accordingly, the present invention may take a form of an entirely software embodiment or an embodiment combining software and hardware. Furthermore, the present invention may take the form of a computer program product on a computer-readable storage medium having computer-readable program code means embodied in the medium. Any computer readable medium may be utilized including hard disks, CD-ROMs, optical storage devices, or magnetic devices.

As is understood by those skilled in the art of Web client/server communications, a user access a server by establishing a TCP connection between client and server. Client and server communicate by using HTTP protocol over a TCP connection. Data transferred from servers to clients are HTTP objects (e.g. HTML objects).

Furthermore, any reference to names of a product or of a company is for the purpose of clarifying our discussion and they are registered to their respective owners.

Glossary of Used Terms

Before explaining this invention, let us first explain some of the terms that will be used throughout.

ASP stands for Active Server Page and it is used to dynamically create web pages on the server side and transmit them to a requesting client as HTML objects.

Back end means a computer system where users retrieve (content) from and view it at another computer (front end). In the case of the Internet a computer with a web server is the back end.

Cookie is a file kept by a web browser at the end user computer where the server or a script program running at the web browser send requests to the browser to save a value in the cookie file for later retrieval. It has a cookie name and the cookie's value and the date that it will expire.

Dynamic e-shop and dynamic web site is when products (also called goods) and services are part of the hosting e-shop or web site. That is, the e-shop or web site will do all the required maintenance. Each e-shop or web site is hosted within an e-mall.

E-services are services (also called contents) supplied to VNRI by a third party or part of VNRI. E-services are used in conjunction with VNRI's e-commerce. These e-services have means for associating with the e-commerce counterpart.

Front end means a computer system where users view information (also called content and used interchangeably) that is located at another computer system (back end). In the case of the Internet a computer with a web browser is the front end.

HTML stands for Hypertext Markup Language.

HTTP stands for Hypertext Transfer Protocol.

JavaScript is a commonly used language by clients and servers as well. On the client side it is used as means of interacting with HTML objects. On the server side it is used as a script language and it works in conjunction with the ASP and others technologies.

Satellite e-mall is a sub-set of an e-mall created by the virtual network system or by each individual e-mall (in the case of customized satellite e-mall). An e-mall has the option to include or to exclude services from a satellite e-mall.

Session Variable is a variable that the web server keeps in its memory for the duration of a web browser user visit to the web site or, in most cases, 20 minutes after the user access the last page from the web server. Any value can be assigned to a session variable. One good example is the use of session variables with the ASP technology.

SQL stands for Structured Query Language and it is a text string used by a database server (a specialized software to manage databases) as to guide it in querying and retrieving database objects thereof.

TCP stands for Transfer Control Protocol.

URL stands for Uniform Resource Locator and it is an Internet address used by a web browser to fetch a web page object from a web server.

WEB SERVER is a computer with specialized software to manage communication between a client's web browser and the server computer. Also, it communicates with others technologies that are within the server computer.

VNRI stands for Virtual Network Resource Infrastructure (also called virtual server and used here interchangeably) and it is the hosting environment hosting all e-malls, satellite e-malls, e-shops, e-distributors and web sites dynamically and virtually. Also, it is where the e-commerce infrastructure is hosted (hardware, software and the Internet gateway).

Virtual e-mall is when an e-mall place goods/services from any e-shop or web site from the virtual network. An e-mall can have e-shops and web sites, but cannot have products/services of its own (dynamically). Any products offered by an e-mall are virtual ones.

Virtual e-shop or virtual web site is used when an e-shop or web site offers products/services from another e-shop or web site within the virtual network. Products/services are called virtual products because they are available to an e-shop or web site other than the hosting one.

I) The Virtual Network

Let us further explore the virtual network. There will be many e-malls, e-shops, e-distributors and web sites in the virtual network. An e-mall may or may not have a dynamic e-shop or web site. Also, an e-shop or web site may or may not have products and/or services. An e-mall can have an e-shop or web site that is empty (without products or services). Based on the previous situation, all products and/or services offered by an empty e-shop or web site are virtual ones.

Lets further explore the interaction that goes between a client (user) computer and the virtual network server.

A user at a client web browser initiates communication with the virtual network server and register an e-mall. Other users will do the same. After an e-mall is registered it is ready to receive e-shops or web sites.

Let us say that, a user registers an e-shop and call it "E-SHOP A". The user of E-SHOP A then adds products to it. Other registered e-shops at the network will place products in their e-shops as well. This process is called dynamic, since products are within each individual e-shop.

For the sake of our discussion, lets assume that, there are two e-shops: E-SHOP A and E-SHOP B. They both have products. Now the user of E-SHOP B accesses the virtual network server, receives a page with information about services, products, departments, categories, sub-categories, e-shops and web sites. This user now includes, products from E-SHOP A and a sub-category, then, sends it to the virtual network server. The network server receives and saves E-SHOP B selection (products from E-SHOP A and a sub-category) into a virtual database table.

Now, a user accessing E-SHOP B will have products from E-SHOP A and a sub-category with all of its products (virtually), also, all of E-SHOP B products (dynamically).

As we've said before, a client computer communicates with a server computer over the Internet or Intranet by a TCP connection. Moreover, a client sends HTTP requests to server. The server then process such requests and creates a web page (e.g. HTML objects), and sends it back to the client.

Furthermore, a client computer has a screen that is the means of interfacing with a user. It also has web browser software that runs in the client computer memory. The web browser is the client computer user's interface. And it presents a web page as objects (e.g. HTML objects) to the user. The objects can be text, audio, video, image, forms, links, etc. Also, the web browser communicates with a server computer.

Let's move on and discuss the Virtual Network Resource Infrastructure (henceforth called VNRI). The virtual network offers an infrastructure for worldwide e-commerce at a single location and available to anyone without any e-commerce infrastructure or even a server.

This VNRI infrastructure is located at a single location and it will be the back-end for worldwide front-ends accessing it. Also, this infrastructure will include software programs to manage all the VNRI associated e-malls, satellite e-malls, e-distributors and web sites. Further, it will include Internet, e-mail, credit cards gateways and all the necessary hardware.

The objective of this invention is to allow the creation of a plurality of e-malls and each e-mall will use VNRI's hosting and management means and offer e-shops, e-distributors and web site an e-commerce and e-service infrastructure (hosting and management) without having the infrastructure of their own. Each e-mall will be able to sell its e-shops products and e-shop's products located in other e-malls. Also, an e-shop will be able to sell its products and others e-shops' products. There will be only a single infrastructure for a worldwide use and it will be within VNRI. As it is now clear, e-malls, satellite e-malls, e-distributors and web sites, all use the VNRI for e-commerce and e-services. This process will give the idea that each one has an e-commerce and/or e-service infrastructure of its own because each will offer an end-user means for using all the available resources within the VNRI.

Figure 2:
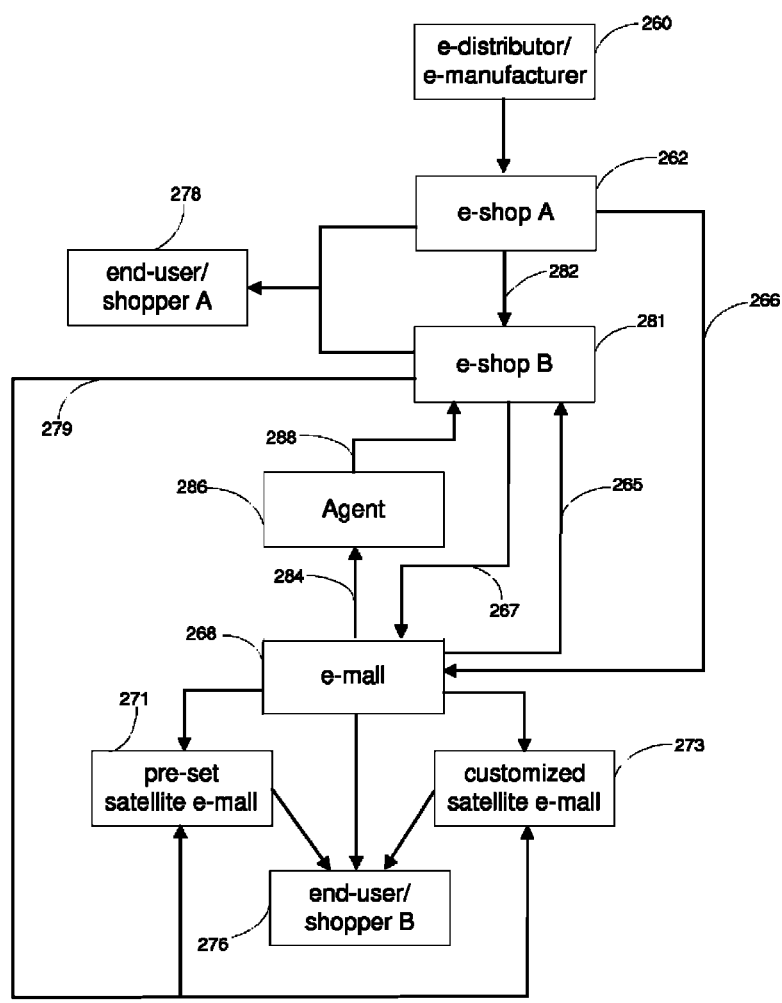
FIG. 2 illustrates the e-commerce resource infrastructure available to each e-commerce of FIG. 1.

FIG. 1 shows e-commerce located at different parts of the world. FIG. 2 shows the e-commerce infrastructure that is available to each e-commerce of FIG. 1. FIGS. 23, 24, 25, 26, 27 and 28 show the process of uploading interfaces to each of the e-commerce of FIG. 1. Each e-commerce of FIG. 1 is able to present its solutions as if each one had its own e-commerce infrastructure.

Back to FIG. 1. It shows a method of using a single e-commerce resource infrastructure at a single location and providing e-commerce solution worldwide without each one having to replicate the e-commerce resource infrastructure at each location.

As it is shown, there is an e-commerce located in Brazil 102, USA 104, Mexico 106, France 108, Germany 110 and Canada 112. Although the e-commerce is spread worldwide, the e-commerce resource infrastructure is at a single location at VNRI 100.

FIG. 2 is the e-commerce infrastructure that is available to each e-commerce that was presented in FIG. 1 and it is within VNRI 100 of FIG. 1.

There are three layers of e-commerce within VNRI—FIG. 2. E-distributors/e-manufacturers 260 (henceforth called e-distributors). E-malls 268 and satellite e-malls (pre-set satellite e-mall 271 and customized satellite e-mall 273).

Each will present e-commerce differently. Each e-distributors 260 has an e-commerce web site and will be able to sell its products directly (e-shop A 262) or have other e-shops (e-shop B 281—arrow line 282) and e-malls (e-mall 268—arrow line 266) selling them virtually. In either case, end user/shoppers (henceforth called end user) will be able to view each one independently. End user A 278 views e-shop A 262 and e-shop B 281.

E-malls, on the other hand, have the means to allow the creation of e-commerce e-shops or use the services of agents. Each e-shop will be able to sell its products directly or have them sold by the e-mall and its affiliated satellite e-malls. E-mall 268 has e-shop B 281 (arrow line 265). As shown, e-shop B 281 has end user A 278 viewing its products and also end user B 276 is viewing them through e-mall 268, pre-set satellite e-mall 271 and customized satellite e-mall 273.

As presented, all products of an e-shop can be sold by the e-shop, by the e-mall where e-shop is dynamically located and by the e-mall's affiliated satellite e-malls. E-mall 268 has e-shop B 281 (arrow line 265). E-mall 268 sells e-shop B 281 products (arrow line 267). E-mall 268 makes all of its e-shops products available to each of its affiliated satellite e-malls. As shown, e-mall 268 has a pre-set satellite e-mall 271 and a customized satellite e-mall 273. And each one sells products from e-shop B 281 (arrow line 279).

Also, an e-mall will have the means as to allow the use of agents' services. An e-mall can have one or more agents and each agent will be able to offer their expertise to e-shops in a one-to-one basis. An e-shop can be created directly to an e-mall or by an agent, also, an agent can manage e-shops, e-distributors and web sites for one or more e-malls. E-mall 268 has agent 286 and it is the creator (arrow line 288) of e-shop B 281. For sake of simplicity e-shop B 281 has e-mall 268 point to it (arrow line 265) and Agent 286 (arrow line 288).

In this case it means that Agent 286 created e-shop B 281 (arrow 288) by using the e-mall 268 as the holder of e-shop B 281 (arrow 265).

Before proceeding any further, lets explaining what an agent is. An agent is a person authorized to provide management services to the e-mall's e-shops. Also, an agent has log in and management rights to log in and manage e-shops for any e-mall in the virtual network resource infrastructure. An e-shop can be created and managed by its owner or have an agent to represent the e-shops within the e-mall.

Figure 3:
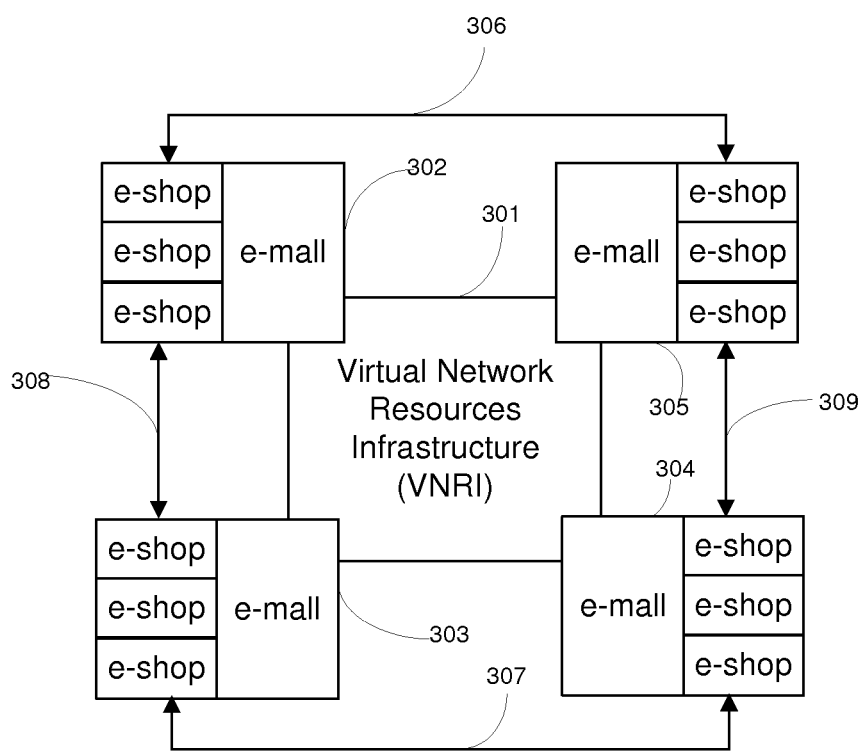
FIG. 3 illustrates the virtual e-shopping network system where e-malls, e-shops, e-distributors and web sites share a single resource.

FIG. 3 shows a virtual e-commerce environment where e-malls (302, 303, 304, and 305) with e-shops share the virtual network resources 301 (e-commerce infrastructure: hardware, software and the Internet gateway). It further shows the ability for one e-shops to cross-sell other e-shops' products virtually (306, 307, 308 and 309).

As it will be understood by those skilled in the art. The virtual network resources will have all the required software and hardware that is needed to host e-malls, satellite e-malls, e-shops, e-distributors and web sites over the Internet or over a computer network.

As it can be seen at FIG. 3, an e-mall will be able to host e-shops as if they had their own e-commerce. And since the system offers means for user plug in interfaces and the availability of different foreign languages, anyone anywhere in the world will be able to offer e-commerce services without the expenses involved.

Figure 4:
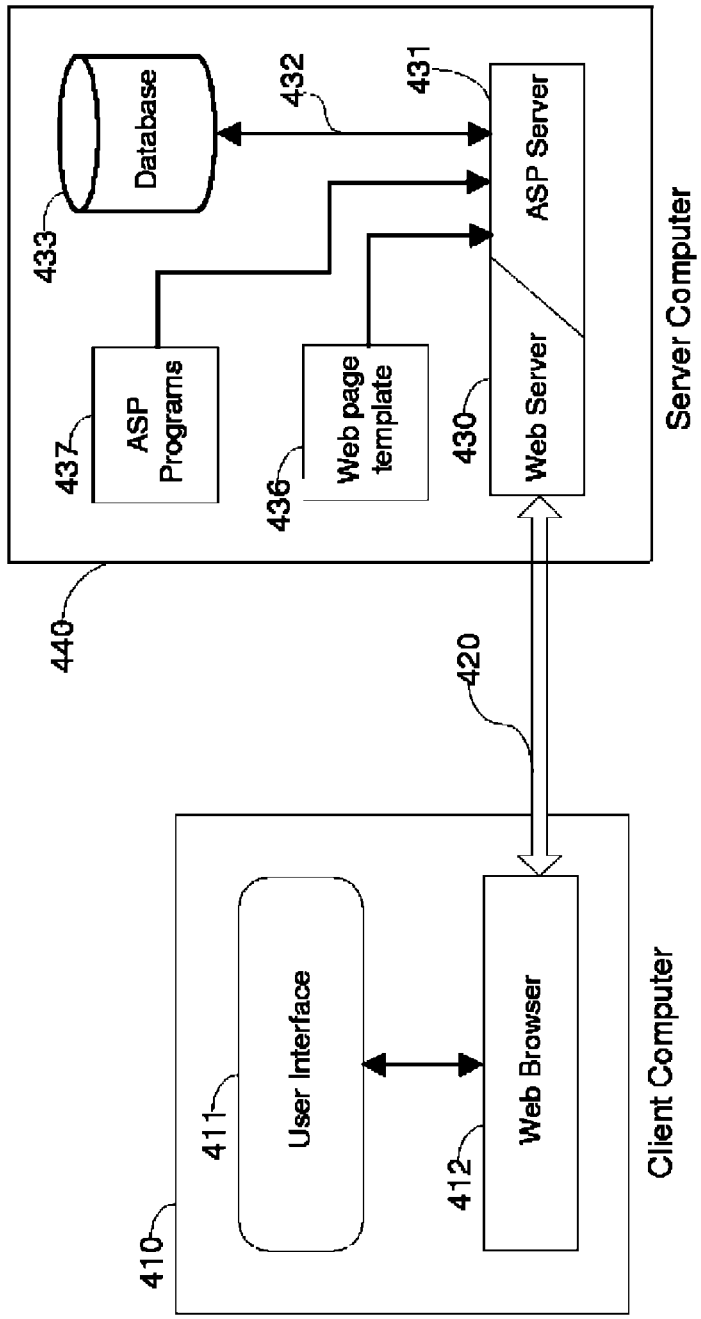
FIG. 4 illustrates a communication link between a client and a server computer. The process of converting ASP pages into the HTML at the server computer, then transmitting it to the client computer.

FIG. 4 shows a communication method between a client computer and a server computer. It should be understood that, not all parts of the client and server computers are shown in the drawing. It is done as is for sake of simplicity, and it is not intended to hide or obscure this invention. Furthermore, those skilled in the art will be able to follow the embodiments and fully understand its meanings.

For example, a memory is present at the client computer, since, this is where the web browser software resides and is executed. The same is true for the screen. Where the web browser presents web objects in a visual form for the user. Neither a means for saving information like a disk unit nor a means for entering data such as a keyboard or a mouse are shown. On the server side, a memory (where Web Server and ASP server are resident) and a storage unit (where the Database, ASP Programs and Web Page Template are stored) are shown. It can also have a screen, mouse, keyboard, etc.

Back to FIG. 4. Client computer 410 establishes a communication link 420 with a server computer 440. The client computer 410 represents the computer with a web browser where an end user views web sites. Server computer 440 is the VNRI hosting the e-commerce.

A user at client computer 410 enters requests through the user interface 411 (web browser). These requests are processed at the web browser 412 that is resident in the client computer memory. For instance, if a link to another page is selected by the end user. The web browser 412 will establish a communication link 420 with server computer 440 and transmit a request for the new web page. Server computer 440 receives the request through the communication link 420 and passes it to the resident web server software 430.

After the server computer 440 receives the request for a new web page, let's say that, the requested web page is an ASP page. The web server 430 connects with the ASP server 431. It in turns reads the web page template 436 and ASP programs 437. Next, the ASP server 431 will include the ASP programs 437 into the web page template 436, thus, forming a single file and executes it. There are cases that as the file is executed, the ASP program will need data from a database. In such cases, the ASP server 431 establishes a link 432 with the database 433 then reads/writes to it, as needed.

After a line of programming code of the ASP program 437 is executed, its result (if any) is inserted into the web page template 436, thus, creating a final web page (more of it later). After all lines of the ASP program 437 are executed, the ASP server 431 will pass the final web page to the web server 430. The web server 430 establishes a communication link 420 with client computer 410 and transmits the web page to the web browser 412. And the new web page is displayed on the user interface (screen) 411. Thus finalizing the communication process between a client and a web server computer.

Figure 5:
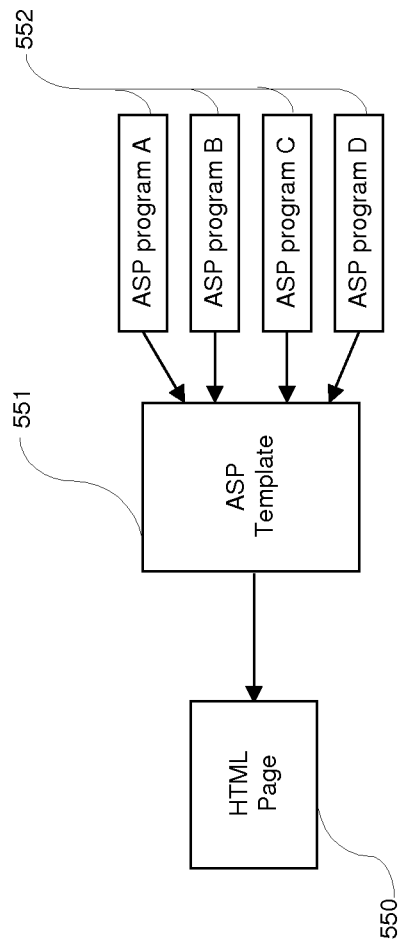
FIG. 5 illustrates the process that takes place in converting ASP pages templates into HTML web pages.

FIG. 5 further explains the ASP process. ASP template 551 receives ASP programs A, B, C and D 552 (usually, they are include files). Next, a web page 550 in the HTML format is created. It is now clear to those skilled in art how the communication process between a client computer and a server computer happens. Also, the process of creating web pages at the server computer with the use of ASP technology.

Since the object of this invention is to present the process of creating worldwide virtual e-malls and each one offering e-commerce to e-shops, e-distributors and web sites, lets first explain the dynamic process involved with e-shops and e-malls. Next, the process that is involved with virtual e-malls and e-shops will be presented as well.

Figure 6:
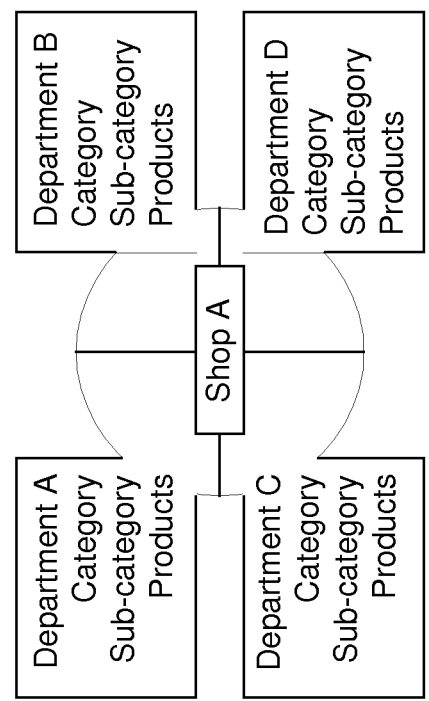
FIG. 6 illustrates a dynamic electronic store.
Figure 7:
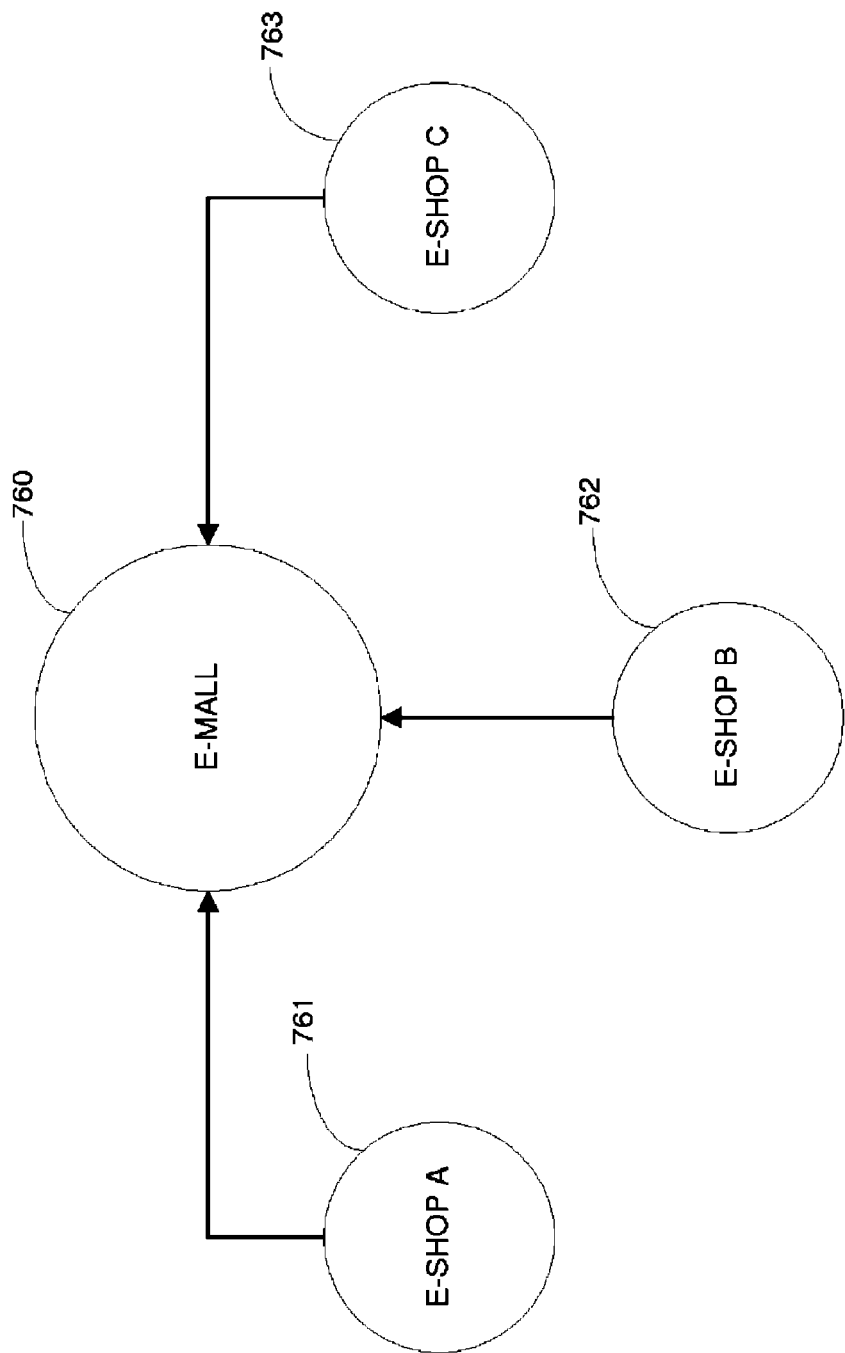
FIG. 7 illustrates a dynamic electronic shopping mall.

FIG. 6 shows a dynamic e-shop with departments. Each department having a category, a category having a sub-category, and the sub-category having products. It should be noted that, a department can have one or more categories, a category can have one or more sub-categories, and a sub-category can have one or more products. FIG. 7 shows a dynamic E-MALL 760 with three e-shops: E-SHOP A 761, E-SHOP B 762 and E-SHOP C 763. A dynamic e-mall is the host for one or more dynamic e-shops (FIG. 6).

Now that we know the dynamic process, let's move on and explore our virtual network concept. FIG. 7 shows an e-mall 760 with three e-shops: E-shop A 761, E-shop B 762 and E-shop C 763. FIG. 1 shows the VNRI with e-commerce worldwide. Each e-commerce at FIG. 1 will have the same e-commerce infrastructure that is available to the e-mall of FIG. 7. It is like we're taking a dynamic e-mall of FIG. 7 with dynamic e-shop of FIG. 6 and offering means for their replication worldwide. Also, each one will have the complete e-commerce infrastructure that is available at the VNRI (FIG. 2).

Furthermore, the VNRI has hosting and management means for hosting and managing various e-malls and each e-mall will use the VNRI hosting and management means for hosting and managing e-shops, e-distributors and web sites. The VNRI has the means for allowing the offering of e-commerce solution to e-malls, satellite e-malls, e-shops, e-distributors and web sites.

Figure 8:
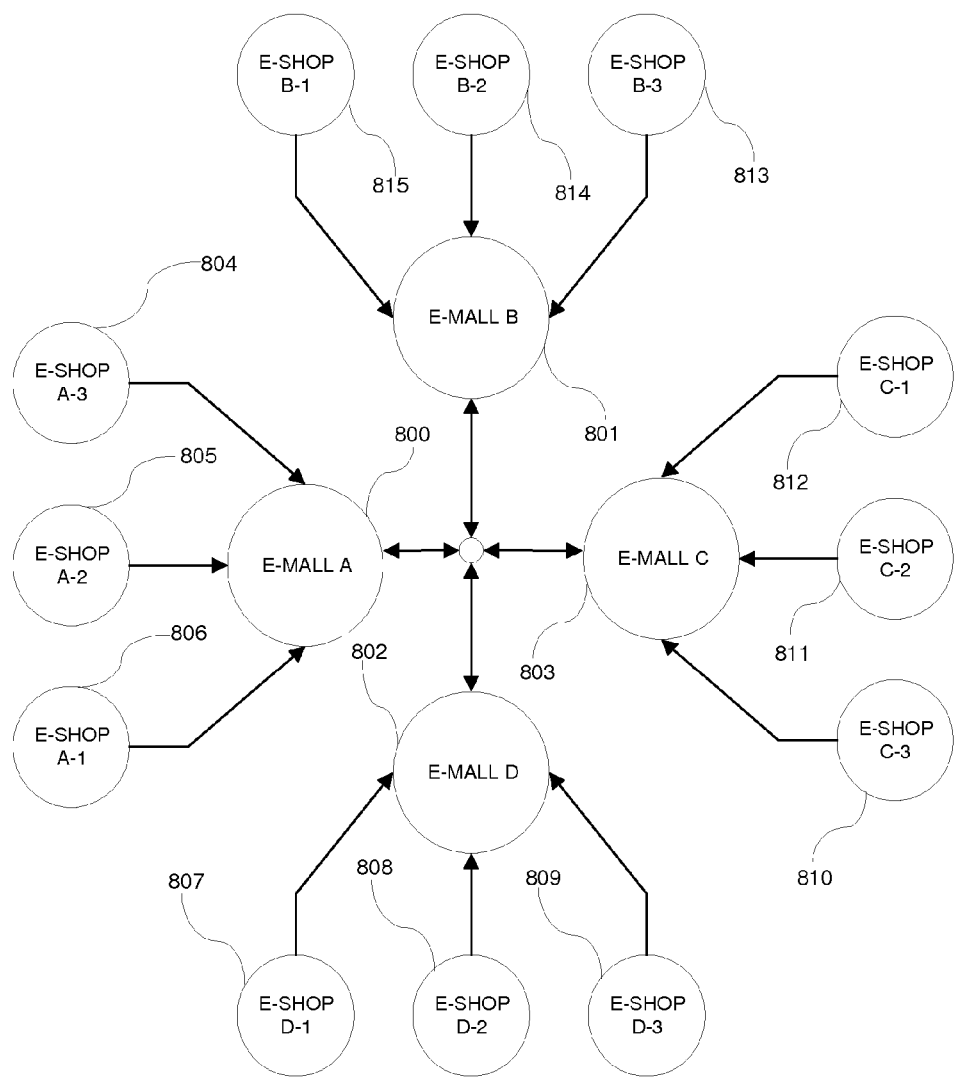
FIG. 8 illustrates multiple dynamic electronic shopping mall with multiple dynamic electronic shops.

FIG. 8 is an overview of a virtual e-mall where four e-malls coexist and each having their dynamic e-shops. As we further explore it, we'll see that each e-shop is able to share its products with others e-shops and e-malls in the virtual network. Each e-mall has three dynamic e-shops. E-MALL A 800 has E-SHOP A-1 806, E-SHOP A-2 805 and E-SHOP A-3 804. E-MALL B 801 has E-SHOP B-1 815, E-SHOP B-2 814 and E-SHOP B-3 813. E-MALL C 803 has E-SHOP C-1 812, E-SHOP C-2 811 and E-SHOP C-3 810. E-MALL D 802 has E-SHOP D-1 807, E-SHOP D-2 808 and E-SHOP D-3 809.

Figure 9:
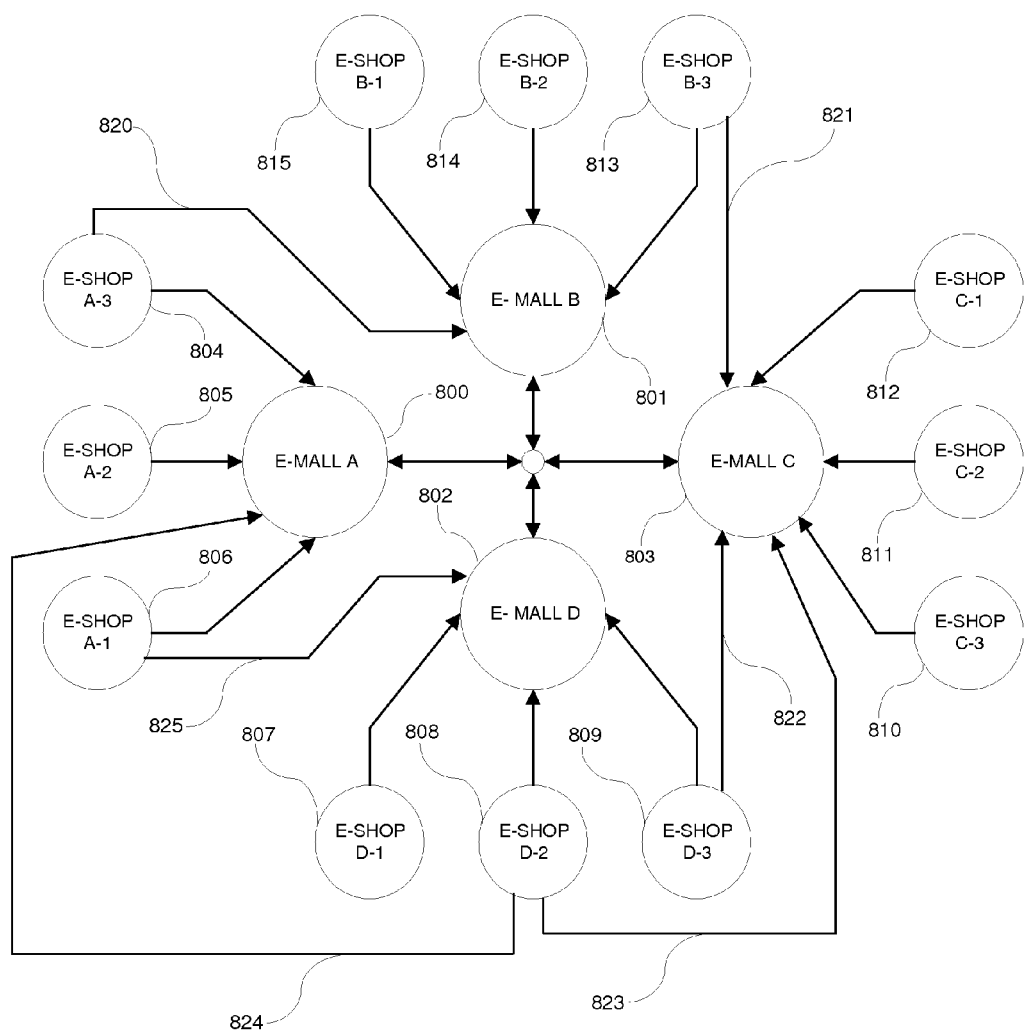
FIG. 9 illustrates how dynamic electronic shops become virtual ones in the dynamic shopping mall.

FIG. 9 is a further embodiment of FIG. 8. It shows how to create a virtual e-shop. Dynamic e-shops are made virtual once they are placed at others e-malls or e-shops within the VNRI. For instance, dynamic E-SHOP A-1 806 is now virtual 825 at E-MALL D 802. Dynamic E-SHOP A-3 804 is now virtual 820 at E-MALL B 801. Dynamic E-SHOP B-3 813 is now virtual 821 at E-MALL C 803. Dynamic E-SHOP D-2 808 is now virtual 823 at E-MALL C 803, and also, virtual 824 at E-MALL A 800. Finally, dynamic E-SHOP D-3 809 is virtual 822 at E-MALL C 803.

Figure 10:
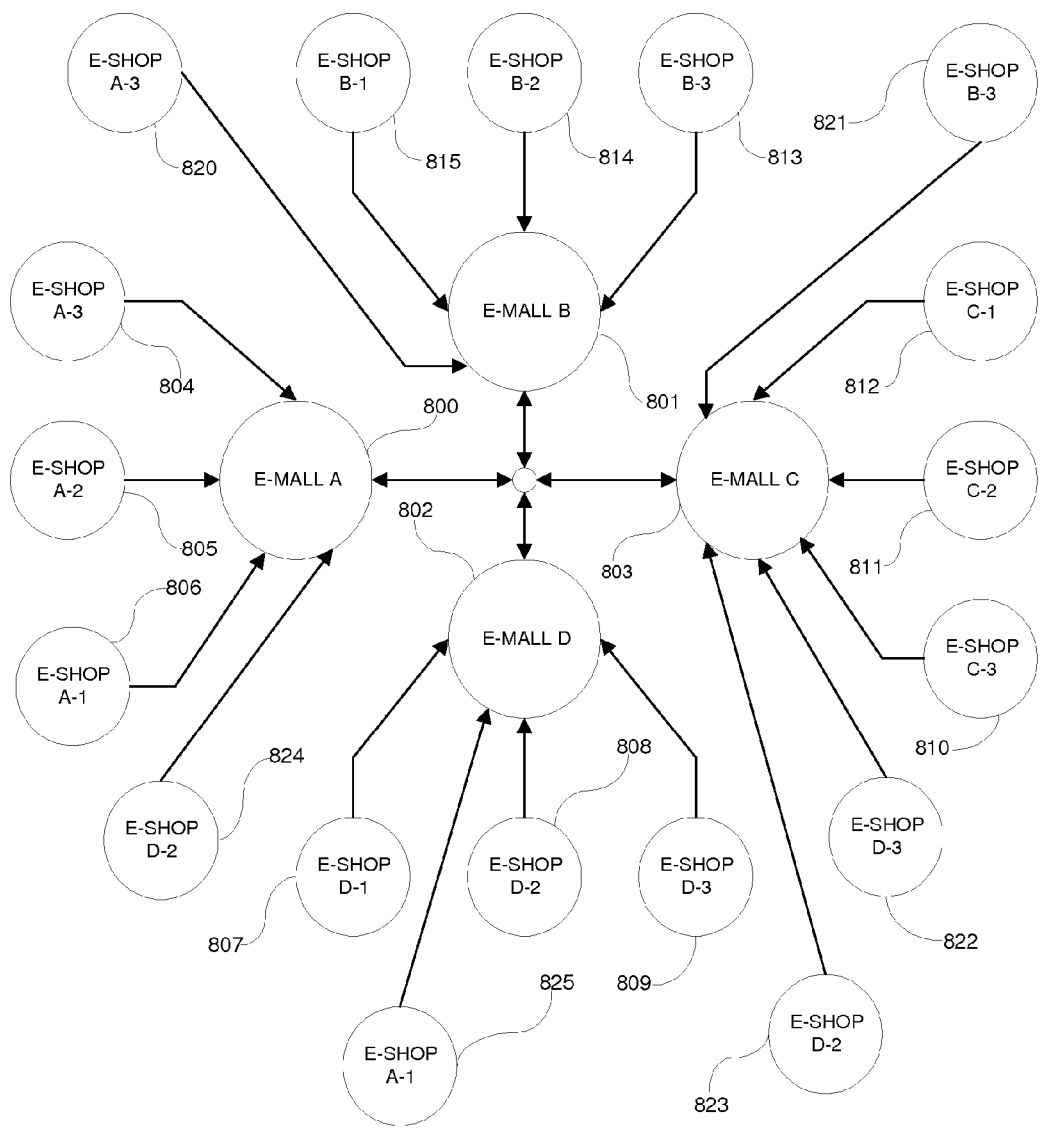
FIG. 10 illustrates virtual electronic shopping mall with dynamic and virtual electronic shops.

FIG. 10 is a further embodiment of FIG. 9 with virtual e-shops included. As it is shown, E-SHOP A-1 is dynamic 806 at E-MALL A 800 and it is virtual 825 at E-MALL D 802. E-SHOP A-3 is dynamic 804 at E-MALL A 800 and it is virtual 820 at E-MALL B 801. E-SHOP B-3 is dynamic 813 at E-MALL B 801 and it is virtual 821 at E-MALL C 803. E-SHOP D-3 is dynamic 809 at E-Mall D 802 and it is virtual 822 at E-MALL C 803. E-SHOP D-2 is dynamic 808 at E-MALL D 802 and it is virtual 823 at E-MALL C 803, and also, virtual 824 at E-MALL A 800.

Further, a dynamic e-shop becomes a virtual one by its products being shared by others e-shops in the virtual network. Let's further explain it. If a buyer is accessing E-MALL A 800, he/she will have all dynamic e-shops (E-SHOP A-1 806, E-SHOP A-2 805 and E-SHOP A-3 804) and the virtual E-SHOP D-2 824 as well. E-MALL D 802, which has E-SHOP A-1 825 now available as a virtual one, and it is dynamic 806 at E-MALL A 800. E-MALL C 803 has E-SHOP D-2 823 and E-SHOP B-3 821 as virtual, and finally, E-MALL B 801 has E-SHOP A-3 820.

Figure 11:
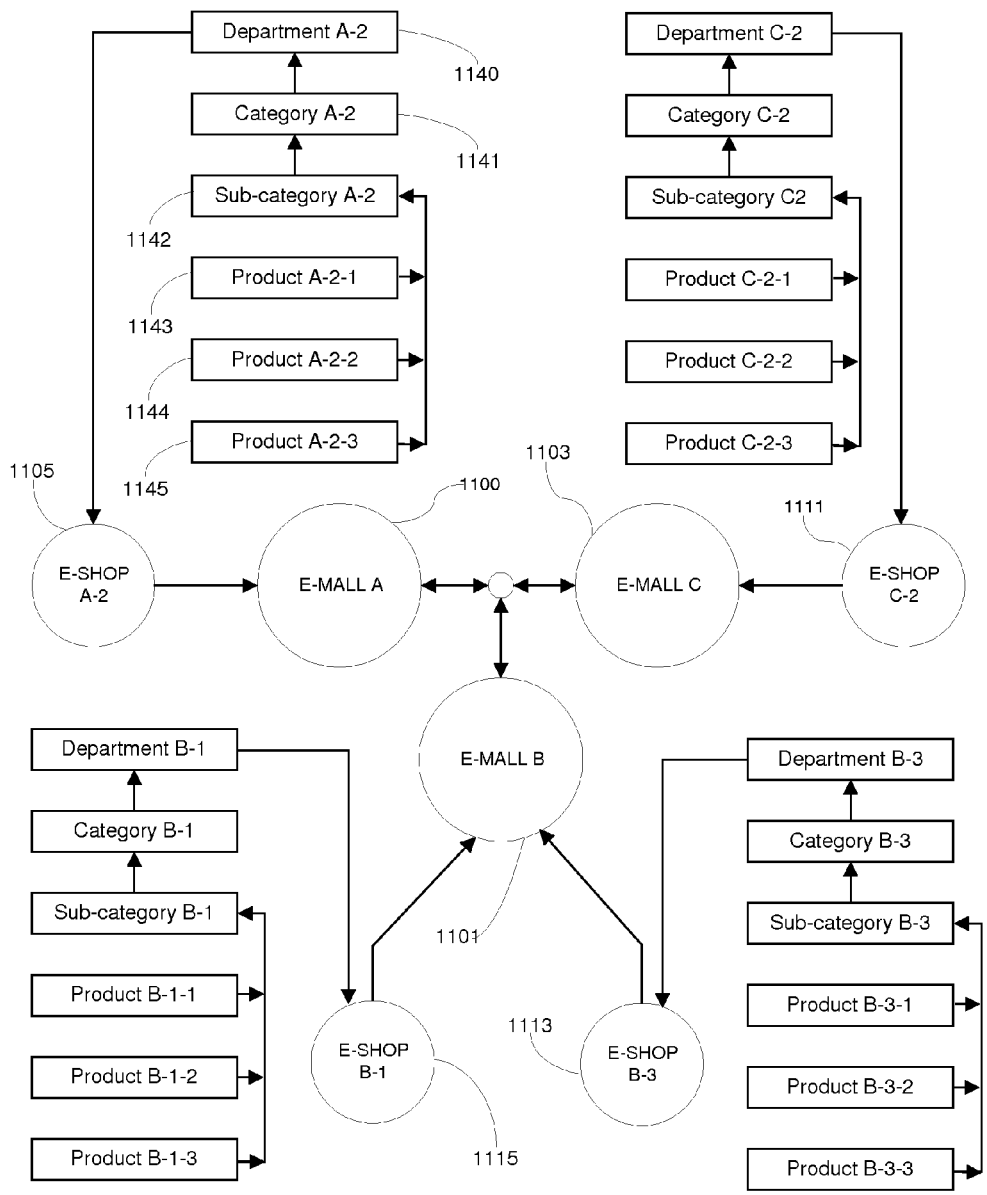
FIG. 11 illustrates multiple dynamic electronic shops with departments, category, sub-category and products in a dynamic shopping mall.

FIG. 11 Shows dynamic departments, categories, sub-categories and products within individual e-shops, as we will see, they will also become virtual ones, like we've seen with the e-shops. Department, category, sub-category and products are dynamic at E-SHOP A-2 1105 at E-MALL A 1100. The same is true with E-SHOP C-2 1111 at E-MALL C 1103. E-SHOP B-1 1115 and E-SHOP B-3 1113 both are dynamic at E-MALL B 1101.

For sake of simplicity, only one department with one category and one sub-category are shown. It should be noted that, more than one department can exist at an e-shop; a department can have one or more categories, and a category can have one or more sub-categories.

Figure 12:
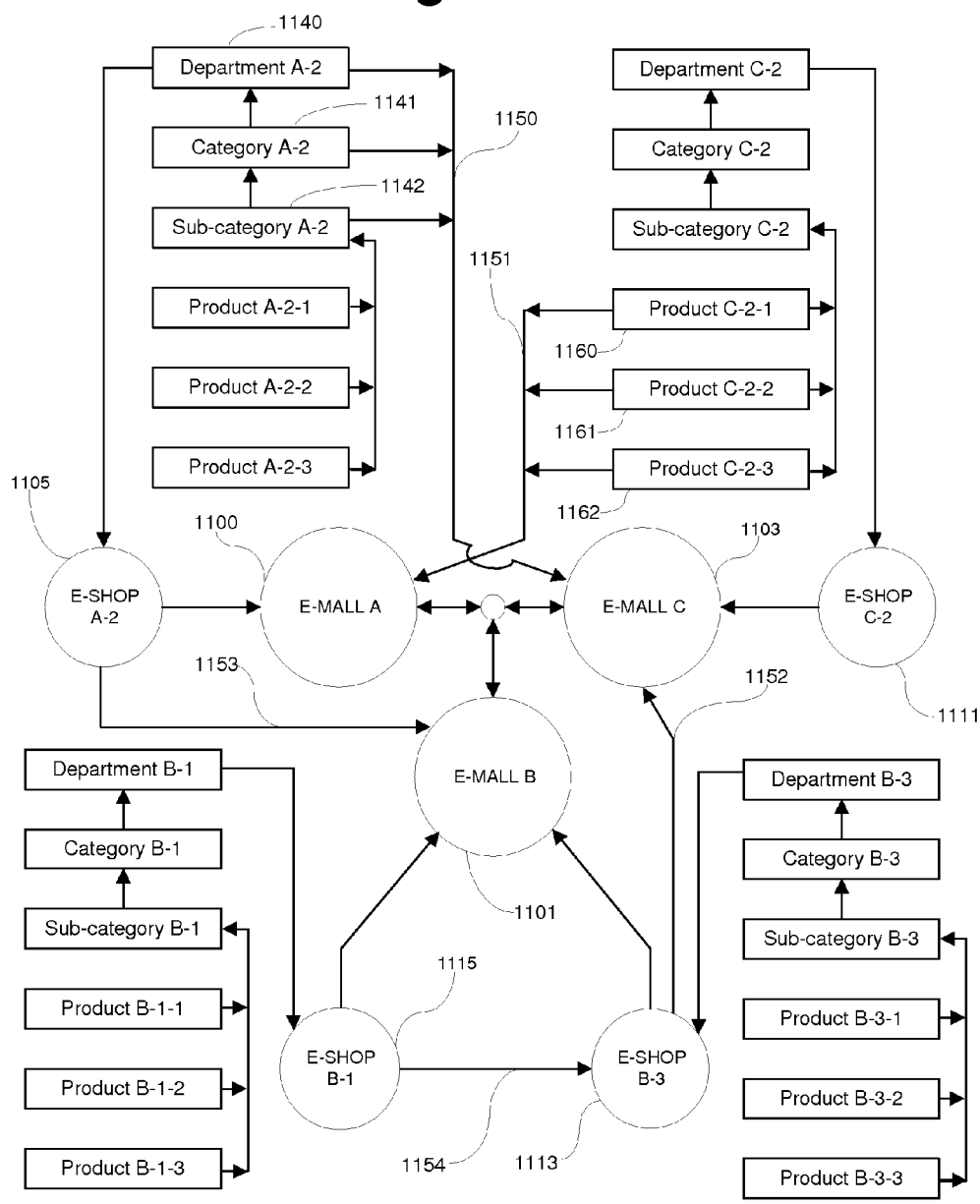
FIG. 12 illustrates how a dynamic electronic shop's departments, category, sub-category and products become virtual ones in the electronic dynamic shopping malls and dynamic electronic stores.

FIG. 12 is a further embodiment of FIG. 11. It shows dynamic departments, categories, sub-categories, products and e-shops becoming virtual ones. As it is shown, E-SHOP A-2's 1105 (Department A-2 1140, Category A-2 1141 and Sub-category A-2 1142) are now virtual 1150 at E-MALL C 1103. E-SHOP C-2's 1111 (Product C-2-1 1160, Product C-2-2 1161 and Product C-2-3 1162) are now virtual 1151 at E-MALL A 1100. E-SHOP A-2 1105 is virtual 1153 at E-MALL B 1101. E-SHOP B-3 1113 is virtual 1152 at E-MALL C 1103 and E-SHOP B-1 1115 is virtual 1154 at E-SHOP B-3 1113. As it can be seen, dynamic e-malls and e-shops can have any combination of e-shops, departments, category, sub-category and products virtually.

Before we continue with our discussion, lets first review the dynamic database table of FIG. 13 and virtual database table of FIG. 14. The dynamic database table of FIG. 13 holds all data information about all e-malls e-shops and web sites. Virtual database table of FIG. 14 is the database table that represents the virtual part of the virtual network.

FIG. 13 shows a database table for a dynamic configuration of FIG. 11. Lets go back to FIG. 11 and explain E-SHOP A-2 1105. As it is shown, Department A-2 1140, Category A-2 1141, Sub-category A-2 1142, Product A-2-1 1143, Product A-2-2 1144 and Product A-2-3 1145 are within E-SHOP A-2 1105 located at E-MALL A 1100. The first three rows (rows 1, 2 and 3 of the ID column) of the dynamic database table of FIG. 13 shows, E-Shop A-2 at the column Shop_Name it represents the E-SHOP A-2 1105 (FIG. 11). Department A-2 at the column Department it represents Department A-2 1140 (FIG. 11). E-Mall A at the column Mall_Name it represents E-MALL A 1100 (FIG. 11). Category A-2 at the column Category it represents Category A-2 1141 (FIG. 11). Sub-category A-2 at the column Sub-category it represents Sub-category A-2 1142 (FIG. 11). Product A-2-1, Product A-2-2 and Product A-2-3 at the column Product_ID they represent Product A-2-1 1143, Product A-2-2 1144 and Product A-2-3 1145 (FIG. 11). Anyone skilled in the art will be able to follow the remaining rows of the table of FIG. 13 and the diagram of FIG. 11.

FIG. 14 shows a database table for the virtual part of FIG. 12. And as we've done with FIG. 13, we'll explain the first three rows (rows 1, 2 and 3 of the ID column). The column Virtual_Mall represents the e-mall that virtually receives products/services from other e-shops. E-MALL A at the column Virtual_Mall represents E-MALL A 1100 (FIG. 12). The value Product at the column Type of FIG. 14 says that they are virtual products 1151 (FIG. 12). And finally, the names of the virtual products at the column Virtual_Type_Name (Product C-2-1, Product C-2-2 and Product C-2-3) represent products (Product C-2-1 1160, Product C-2-2 1161 and Product C-2-3 1162—FIG. 12). Also, Department, Category Sub-category and Shop at the column Type of FIG. 14 indicate their respective dynamic types of FIG. 12.

It should be noted that, dynamic database table of FIG. 13 and virtual database table of FIG. 14 can be related, although not shown. Also, anyone skilled in the art will be able to use both tables and formulate SQL's text string to create queries that will reflect a single resultant table. A combination of SQL text string that represents dynamic table (FIG. 13) and retrieved database objects from the virtual table (FIG. 12) will be used to form a single SQL text string to query the dynamic database table (FIG. 13) and, retrieve a single database table.

Let's go back to FIG. 12 and use E-MALL B 1101 for our next example. E-MALL B 1101 has E-SHOP B-1 1115 and E-SHOP B-3 1113 (dynamic e-shops). It also has E-SHOP A-2 1105 as a virtual e-shop 1153. Now we need to create a single database table from the above example. Two searches are needed. One at the dynamic table (FIG. 13) and another at the virtual table (FIG. 14). At the dynamic table of FIG. 13, a search at the column Mall_Name will be conducted and all e-shops for E-MALL B will be retrieved (rows 4 through 9 of the ID column). Next, at the virtual table of FIG. 14 a search at the column Virtual_Mall is also conducted and it will search for E-MALL B (it is the e-mall that has the virtual E-SHOP A-2 and it is located at Virtual_Type_Name—row # 4 of the ID column). Next, E-SHOP A-2 will be retrieved from the column Virtual_Type_Name. The first part of the query retrieves the dynamic part and the second one retrieves the virtual part. Following is a SQL query to do just that.

```
SELECT * FROM DynamicTable WHERE Mall_Name='E-MALL B'
OR Shop_Name IN (SELECT Virtual_Type_Name FROM VirtalTable
WHERE Virtual_Mall='E-MALL B')
```

First, we'll retrieve all database objects for E-MALL B from the dynamic table of FIG. 13 (rows 4 through 9 of the ID column). Second, we'll retrieve all database objects for the virtual part, which is E-SHOP A-2 (rows 1, 2, and 3 of the ID column of FIG. 13).

So far, we have explained a virtual e-mall where a single database exists for all dynamic e-malls, e-shops, e-distributors and web sites, also, only one database table for the virtual ones. This is just one arrangement, and as we'll see. The dynamic database table can be located at different servers in a network or over the Internet, or a combination of both.

Figure 15:
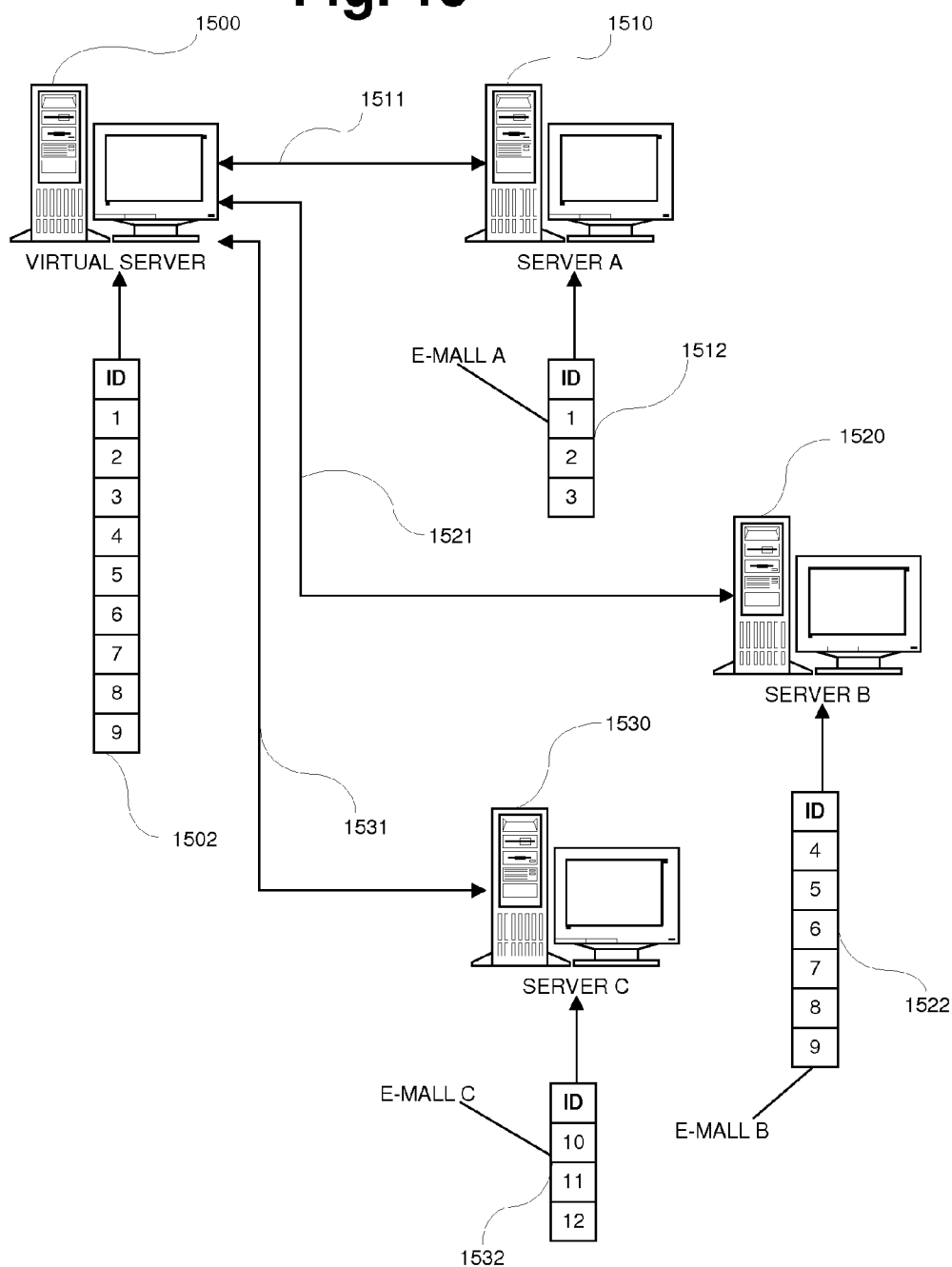
FIG. 15 illustrates multiple dynamic servers' setup sharing database objects with the virtual server.

FIG. 15 shows four servers and each having a database table. For simplicity, we are showing only the table's ID and they represent the table's ID of FIG. 13 (for dynamic servers) and the table's ID of FIG. 14 (for the virtual server). For example, SERVER A 1510 hosts EMALLA 1512. The IDs for the ID column 1512 are 1, 2 and 3 (ID column of FIG. 13). Next, the e-mall name at the column Mall_Name is "E-Mall A" for rows 1, 2 and 3 (ID column of FIG. 13). FIG. 15 shows a virtual server 1500 with a virtual table 1502 (ID column of FIG. 14). VIRTUAL SERVER 1500 sends request and receives data 1511 from dynamic SERVER A 1510 which hosts E-MALL A 1512; sends request and receives data 1521 from SERVER B 1520 which hosts E-MALL B 1522, and sends request and receives data 1531 from SERVER C 1530 which hosts E-MALL C 1532.

Requests are sent and data received from different servers in the network or over the Internet. And they are requests for database objects (table rows) from each server. Once they're received, they are combined and a single dynamic table is formed, then it is related with the virtual table 1502 (ID column) at virtual server 1500. Finally, the result is presented as a single database table to a user. It should be noted that a single virtual database table 1502 (ID column) is shown at virtual server 1500, but it can be more than one table at a single server, or it can be, more than one database tables at multiple servers. Also, virtual server 1500 can have a dynamic database table as well, although not shown.

Also, any of the dynamic servers can offer services and make them available to the virtual server. For instance, if SERVER A 1510 were offering services instead. Services form SERVER A 1510 will be available to VIRTUAL SERVER 1500 and to all its e-malls, satellite e-malls, e-distributors, e-shops and web site. VIRTUAL SERVER 1500 will make all the interfacing with end-users and then pass any user's entered information to SERVER A 1510 and also save at its database as required.

We've described a virtual network system where a resource infrastructure exist (VNRI) and it is offered to third parties (e-mall) and this third parties offer this infrastructure to others (e-mall, e-distributors/manufacturers). It is the intent of this invention to allow this same method to be used as virtual solutions where a single infrastructure exists and it is used by more than one business and each business will in turn uses it and offer solutions to its clients. For example, a manufacturer uses VNRI and offer solutions to its supplier. The manufacturer is like an e-mall and its suppliers are like e-shops. In other words, the process involves three levels: first level is VNRI; second level is an e-mall and the third level is an e-shop. So, VNRI (first level) offers its solution to various locations (second level) and each location (second level) offers VNRI solution (first level) to at least one other location (third level). Also, instead of e-malls, it can be companies with e-portals, also instead of e-hops it can e-services from a company's departments.

II) On-Line Interface Translation Method

As it has been explained, each web page has objects. They can be audio, video, images, links, forms, text, etc. We'll be discussing text object in particular. As we know, the virtual e-mall will be used worldwide. Furthermore, it must be able to display text objects in the user's own native language.

Also, it should have means of translating database objects (products/services), and also, e-shops and e-malls interfaces (text objects).

First, let's explore the on-line page interface translation (text objects); second, the translation of products/services (database objects), and lastly, we'll show how they will enhance the user's virtual shopping experience.

The following are the steps for on-line interface translation: a user at a client selects a drop down or any other means for selecting a foreign language and the client sends this request to a server. A program in the server receives the user selected foreign language as encoded information and it represents the user selected foreign language. The program in the server has a function to translate text objects and it also has program code means for translating database text objects.

Let's first explore the text object translation. The function translating text objects receives two parameters: one is the encoded information (the user selected foreign language) and the other parameter is a code reference. The code reference is used to search a database table and retrieve a row with text objects in different foreign languages in each of its columns. The encoded information is used for retrieving a column which is a reference to the database table's row that was received in the previous step and it contains text object is in the user selected foreign language.

Now let's explore the translation of database text objects. The encoded information (selected foreign language) is combined with a SQL text string and it is a query expression. Once a program in the server computer executes the query expression, the query's result will only include database text object in the user selected foreign language.

We'll be using ASP (Active Server Page) technology along with JavaScript language for our explanation, since, they are frequently used on the Internet. FIG. 16 shows a table (languagetable) with four columns: ID, Phrase_Code, ENG and POR. FIG. 17 shows two parts of a drop down form object and, FIG. 18 the actual HTML code for the drop down form object of FIG. 17.

Let's explore the drop down form object (FIG. 17). It has two parts: the element that is hidden from the user and, the element used by a user to change its state (make a selection). The table of FIG. 17 has two columns: the first column (Hidden Elements), represents the hidden part that the browser uses to send a representation of the user selection to server; the second column (drop down choices), shows the drop down choices used by the user to make a selection. FIG. 18 is the HTML code that creates the drop down of FIG. 17.

Back to FIG. 18. The line "<form name=changelanguage action=newlanguage.asp>" (line # 2) indicates the start of a form object and "</form>" (line # 7) the end of it. The value at the action element of the form tag is "newlanguage.asp" (line # 2). It will be the page that the web browser will request from the server once the form changelangue is submitted and pass its object (form objects) to it as well. The line "<select name=language onChange='changeLanguage( )'>" (line # 3) indicates the start of a drop down object and "</select>" (line # 6) the end of it. The following two lines are the drop down options. The line "<option value=ENG>English</option>" (line # 4) is the first option and "<option value=POR>Portuguese</option>" (line # 5) is the second option. And they are the choices "English" and "Portuguese" of the drop down displayed on the web browser.

Let's say that the drop down currently has the option English, as the selected one. Next, a user changes it to Portuguese. Three things will happen: first, the browser will transfer control to function changeLanguage( ); (line # 10) second, the function will submit the form to server document.changelanguage.submit( ) (line # 12)—it is the value at the action of the form changelanguage "<form name=changelanguage action=newlanguage.asp>" (line # 2); and third, the server will retrieve newlanguage.asp (FIG. 19) and pass POR as a parameter to it—POR represents the user's selection.

FIG. 19 shows the newlanguage.asp (ASP page at the virtual server) with a JavaScript program. It is divided into two parts: from beginning of the file (line # 1) up to line # 27 is the ASP program executed by the server. Next, code from the <HTML> (line # 28) tag all the way to the end of the file (line # 45) is the portion sent back to the user's web browser (HTML objects). Also, codes after the <HTML> tag that are surrounded by "<%" and "%>" are pieces of ASP code (it usually returns a value and it is inserted into the HTML page.

Let's delve into newlanguage.asp file FIG. 19. The first line "var Language=Request.Form ("language")" (line # 1) requests the drop down user's selection. It was passed to the server by the client computer (web browser). Now, the variable sLanguage has the string value "POR" (the user selected language).

Next, we have a function called "doTranslate(sPhraseCode,sChosenLanguage)" (line # 3). It has two parameters: sPhraseCode and sChosenLanguage. The first parameter, sPhraseCode receives a code reference value to be used to search the column Phrase_Code of the languageTable (FIG. 16). The second parameter, sChosenLanguage will be an encoded information and it is the user's selected language (the value "POR" at the variable sLanguage). Now the function doTranslate( ) will open connections (database and record set) then perform a query at the languangeTable (FIG. 16). Next, it retrieves a value from column POR—the user's selected language stored at the variable sLanguage. In our example the value at the Query variable is "SELECT POR FROM languageTable WHERE Phrase_Code='ENGL'" (line # 16 and line # 17). The last line is return(languageRS (sChosenLanguage)) (line # 20) and it returns the retrieved value from the data table.

The next set of code of FIG. 19 is a partial HTML code within the ASP page. It includes the actual drop down and the ASP code (between "<%" and "%>"—line # 32 and line # 35) inserts the function doTranslate( ) returned value into the HTML page. There are two lines with Response.Write( )'s. The first one "<% Response.Write(doTranslate ("ENGL", sLanguage)) %>" (line # 32) will translate element for the drop down that says "Inglês", and the second one "<% Response.Write(doTranslate("PORT", sLanguage)) %>" (line # 35) will say "Portugues". The new drop down is in Portuguese, which is the selected language.

Let's explore the previous explanation. Lets take the first drop down element "<% Response.Write(doTranslate ("ENGL", sLanguage)) %>" (line # 32). The function doTranslate( ) receives two parameters: sPhraseCode and sChosenLanguage. SphraseCode receives the value "ENGL" and sChosenLanguage receives the value "POR" (user's selected language). Function doTranslate( ) searches the column Phrase_Code of the languageTable (FIG. 16) for the value "ENGL" (row # 7 of the ID column), then, retrieves the value at the column POR (user selected language) and it is "Inglês".

The function doTranslate( ) is very basic. Other means will be used for retrieving information instead of opening and closing databases and record sets. It was presented as is for simplicity.

Now that we know how text objects of the interface gets translated, we'll go one step further and translate the actual database objects and see how they relate to the virtual e-malls, satellite e-malls, e-shops, e-distributors and web sites.

FIG. 20 shows a database table with two rows and four columns: ID, Product_ID, Language and Product_Title. The ID column holds the table ID's for each row. The Product_ID column holds the ID for each product. The Language column, holds the language code for each product in the table. The Product_Title column holds the title for each product in the language specified by the language code at the column Language. The first row (row # 1 of the ID column) is in Portuguese (the value at the Language column is "POR" for Portuguese) and the second row (row # 2 of the ID column) is in English (the value at the Language column is "ENG" for English).

Now lets say that, a user views an e-shop and selects a language other than the one currently displayed by the web browser on the client's computer screen. The new screen will show a drop down with the new language, and also, all the web page text objects translated accordingly. This process is called web page text object translation.

Let's now explain how to translate the database objects that are displayed on the page (e.g. product's title, description, etc.). Once a new language is selected, all the database objects at the new web page must be in the new language. And because of this, the new query will also be affected. Some products/services might be in a different foreign language other than the selected one. As we can see, the number of available products/services will also change.

FIG. 21 shows a dynamic table (DynamicTable2) and it is the same table of FIG. 13 except, we've deleted one column Product_ID, and added two new ones: Product_Title and Language. Following, we have the SQL from our previous example. Let's include the user's selected language in it.

SELECT * FROM DynamicTable2 WHERE Language='POR' AND (
Mall_Name='E-MALL B' OR Shop_Name IN (SELECT
Virtual_Type_Name FROM VirutalTable WHERE
Virtual_Mall='E-MALL B') )

As we see, the query's result will only retrieve rows 1, 4 and 7 of the ID column (FIG. 21). In our previous SQL example without the use of the user selected language, rows 1 though 9 of the ID column of FIG. 13 were retrieved.

As it can be seen, the user's selected language affects the virtual e-malls, satellite e-malls, e-shops, e-distributors and web sites by changing the number of available good/services. For example, there are eight products in English (rows 2, 3, 5, 6, 8, 9, 11 and 12 of the ID column) and four in Portuguese (rows 1, 4, 7 and 10 of the ID column).

III) Template Uploading Method

There are tow ways that a front-end can be interfaced with VNRI's back end: first by selecting a pre-set interface that is within VNRI, second, by a user uploading a customized one. In either case, the interface is the front-end means for accessing the VNRI e-commerce back-end means.

In the case of a user-uploaded interface, it will have means for guiding a server in the inserting of program code and other pieces of information as well (include files). After the uploaded interface is received and processed by the server a new web sited is created and as we've said before, it is the front-end means for a client accessing the server back-end means.

Customized user interface will allow a user at any time to change the front-end look without programming knowledge or knowledge of the server back-end structure. Also, a customized user interface will allow the inclusion of e-commerce in a web site without the expense or expertise that an e-commerce infrastructure requires.

For example, a customized interface is the same one that is in use by a web site. This new customized interface is now uploaded to a server with means for processing and creating a new interface. Now, a client is able to fetch both and present an interface with similar appearance to a user. The web site will present its services in the same way as it had done before and the server where the customized interface is located will present the e-commerce part, thus allowing, a web site without e-commerce means to include e-commerce easily and affordably.

Figure 22:
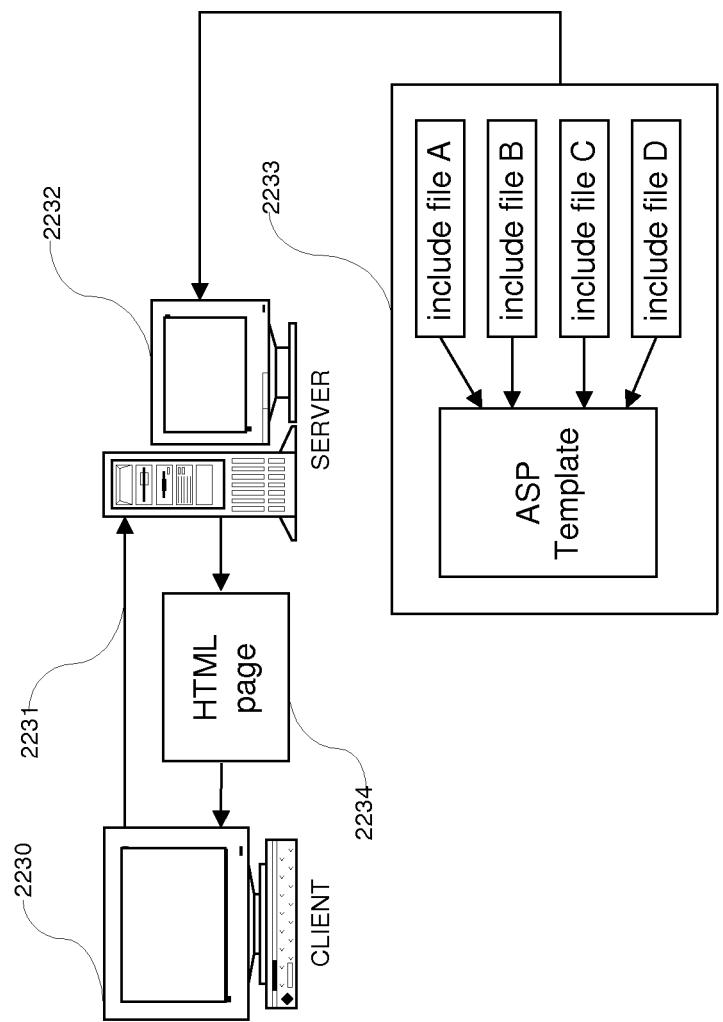
FIG. 22 illustrates a client and a server computer's setup used by the server computer to process ASP pages, and transmits its result in the HTML format to a client computer.

We already know that, a client computer communicates with a server computer over a TCP Internet connection. A client sends requests to server then the server sends objects in the HTML format back to client. These objects are then displayed in the client computer as web pages. FIG. 22 shows this setup. Client 2230 sends request 2231 to server 2232 than server 2232 retrieves an ASP page and include files (files to be included into the ASP page) as needed 2233. Server 2232 then sends the page back to client 2230 as HTML page 2234.

Figure 23:
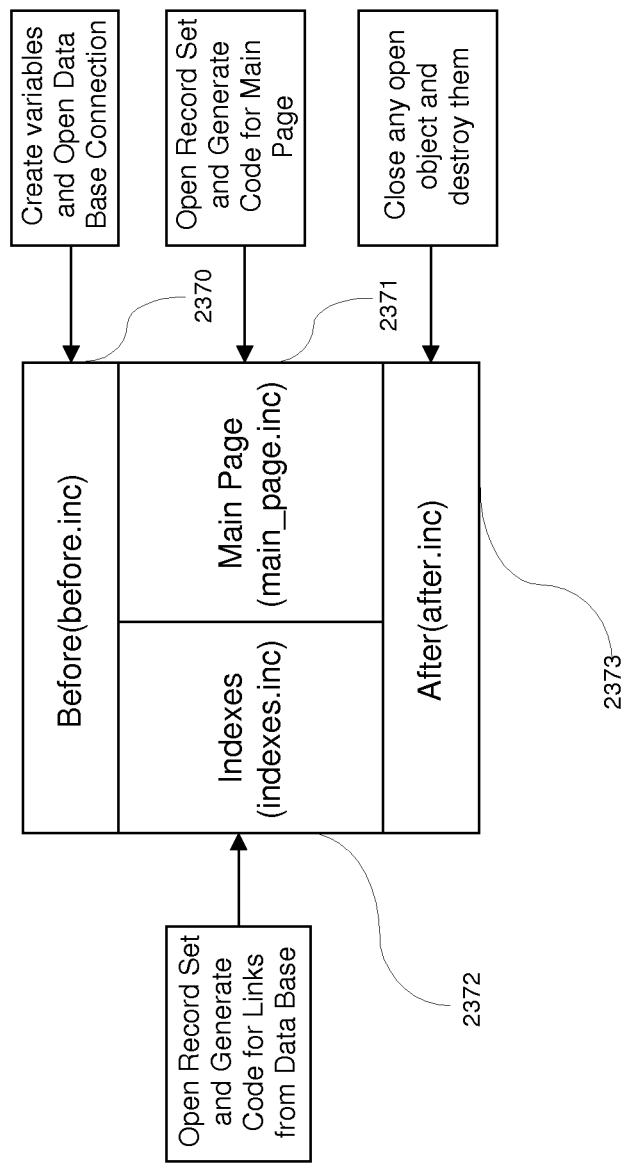
FIG. 23 illustrates a web page template.

A true virtual e-mall, satellite e-mall, e-shop or web site will also need means for the user to change its interface without having to access the server computer which hosts them. FIG. 23 shows an ASP page template. The first part 2370 creates variables and opens database connection. After a connections is opened, indexes representing links to products/services at the e-mall, e-shop or web site is created 2372. After a link is selected, a new page with the products/service information 2371 (e.g. title, description, image, etc.) is received. Finally, before leaving the page, opened connection is released to free resources that are no longer needed 2373.

As it was shown at FIG. 22. An ASP page has include files 2233 and, it can be a program in any acceptable ASP language. First, these include files are inserted into the ASP page, then the server executes them. Their results will in turn be inserted into the new created file. This new file will then be transmitted to the requesting computer (client) in the HTML format 2234.

Figure 24:
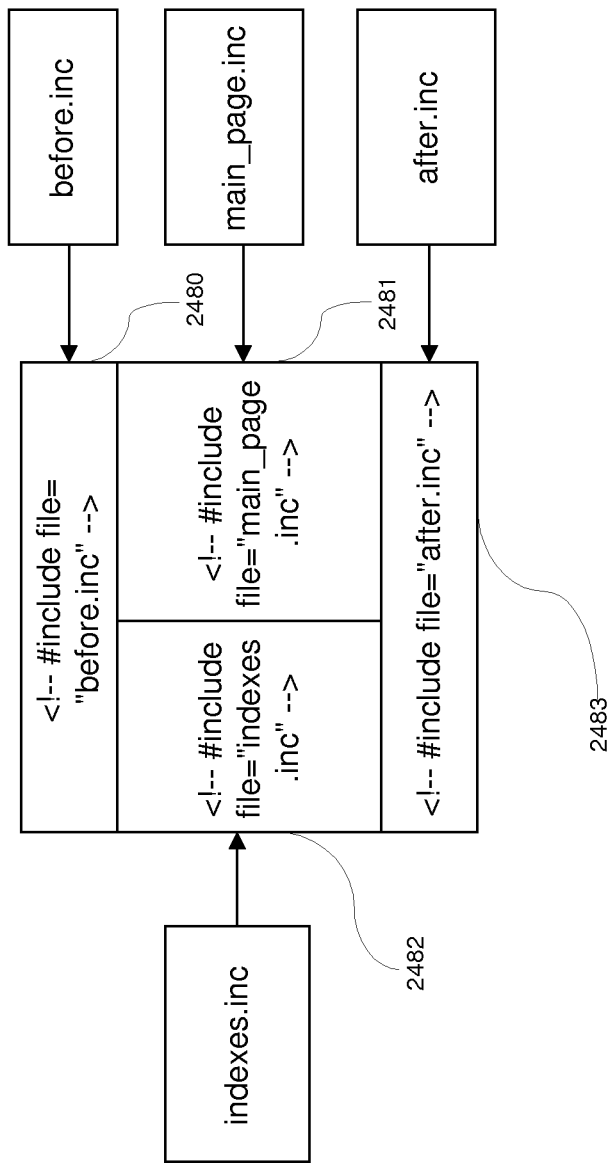
FIG. 24 illustrates a web page template with include files.

FIG. 24 shows the same template from FIG. 23 with include file tags inserted into it. Before.inc 2480 is where database connection, record set and variables are created. Indexes.inc 2482 create web page links and they will be used to select a new a web page—main_page.inc 2481. At the end of the page, all page's objects are released—after.inc 2483.

So, a HTML page can be created from an ASP template by having include files inserted into it. And once we have a standard ASP templates format, we can exchange them in and out without affecting include files. All we need to do is: create a new template with a new look; insert the include files tags, next, a new web page is created based on the same set of include files. Changes can also be made directly to an include file without affecting the remaining ASP page.

Since we are creating virtual e-malls, e-shops, e-distributors and web sites, users will need means for exchanging interfaces without having physical access to the virtual server. It can be a user supplied interface or one supplied by the virtual server.

Figure 25:
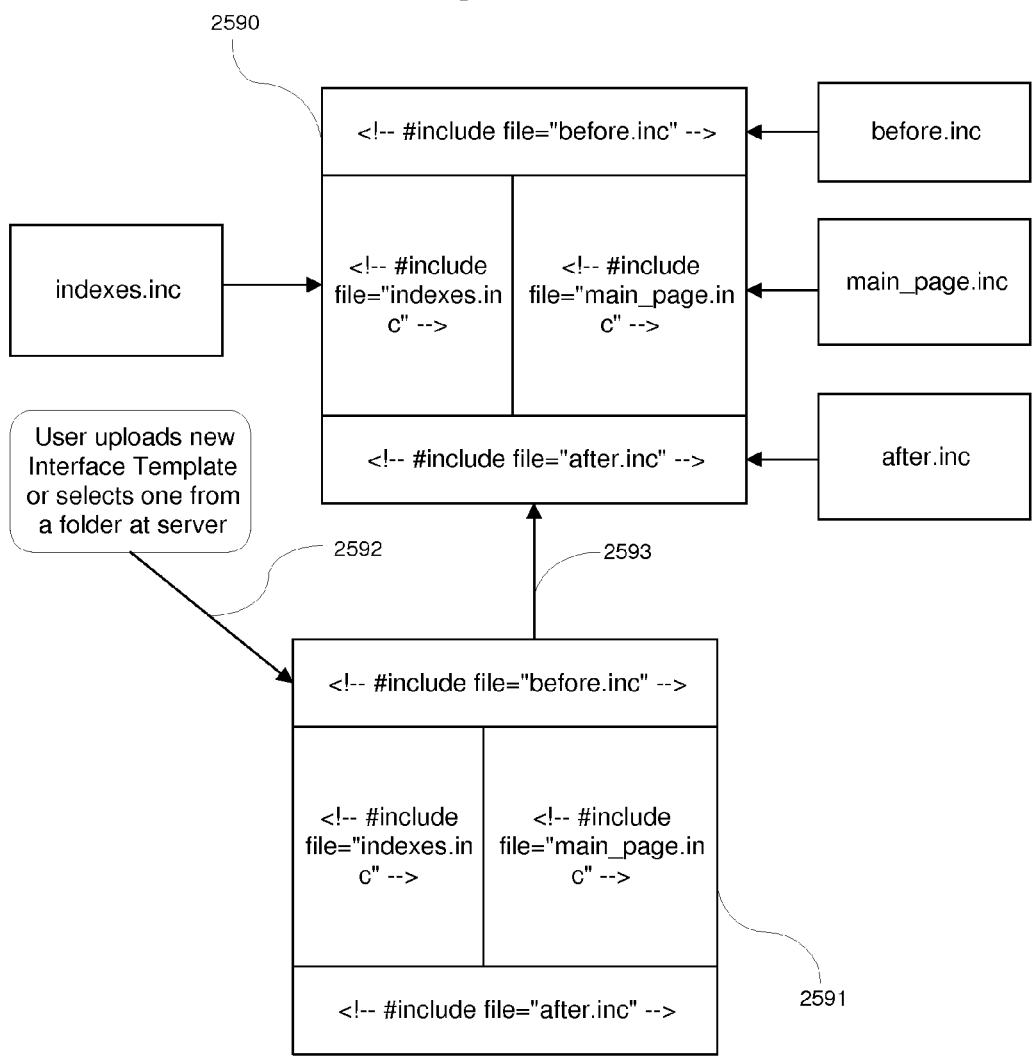
FIG. 25 illustrates the process of exchanging a web page template.

FIG. 25 shows how to replace an interface. The top part 2590 is the old interface and the bottom part 2591 is the new one. Users can upload a new interface template, or chose one from the virtual server 2592. The new interface 2591 will then replace 2593 the old interface 2590.

All interfaces reside in folders within the virtual server. Let's explain what a folder is before proceeding any further. A Folder is a container of files or other folders. A good example is a file cabinet. A file cabinet has drawers—they are like folders; files within a drawer are like files within a folder.

Figure 26:
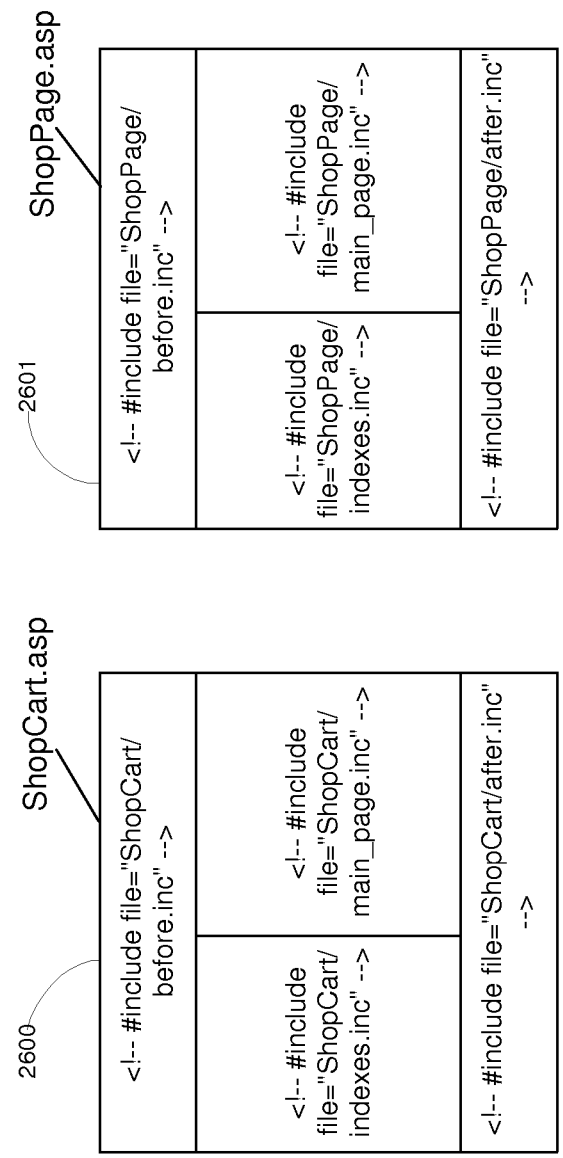
FIG. 26 illustrates a web page template with include files and their respective folders.

FIG. 26 shows two ASP templates. The first one Shop-Cart.asp 2600, has a folder's path added to each include file "<!- -#include file="ShopCart/before.inc"- ->"; the second template ShopPage.asp 2601, has a different path in the include file "<!- -#include file="ShopPage/before.inc"- ->". The folder's path as part of the include files tells the server where include files are located. For example, "<!- -#include file="ShopPage/before.inc"- ->" tells the server that before.inc is located in the folder ShopPage.

FIG. 27 shows the folder structure for FIG. 26. It has three folders: ShopCart 2702, stores all include files for template ShopCart.asp 2600 (FIG. 26); ShopPage 2703 stores all include files for template ShopPage.asp 2601 (FIG. 26), and Templates 2704 stores ASP template ShopCart.asp 2600 and ShopPage.asp 2601 (FIG. 26).

Let's delve into folder Templates 2704. As we see, the file ShopCart.asp 2705 is the same template 2600 (FIG. 26) and the file ShopPage.asp 2706 is the same template 2601 (FIG. 26). Once a new template is uploaded with its respective include files and include file's path into the Template folder 2704, a new interface will then be in place for an e-mall, e-satellite e-mall, e-shop or web site.

Furthermore, a single ASP template can be uploaded and have a program in the server to create others with the correct path in each one of them. We've shown a very simple folders structure with only three folders, in reality, a folder structured can have any number of folders, and a folder can have any number of files. Also, we've named the folder as ROOT 2707 (FIG. 27), although it can be any name. It could've been a name for an e-mall, satellite e-mall, e-shop or web site as well.

FIG. 28 shows a setup where a client computer with a web browser 2813 receives templates from Virtual Server 2815 and Host Server 2814. Host Server 2814 establishes a communication link 2810 with Virtual Server 2815 and uploads a set of templates 2820-a. When the web site is first accessed. Client 2813 requests and receives a new interface 2820-a from Host Server 2814 through connection 2811. Once a user selects any link that refers to the virtual shopping environment, or to virtual web pages (located at Virtual Server 2815). Client 2813 then requests and receives the next set of interfaces 2820-b (web pages) from Virtual Server 2815 through connection 2812. From this point on, Virtual Server 2815 will supply the new interface 2820-b and it will have the same look as the interface 2820-a located at the host computer 2814. The user at the Client Computer 2813 will only notice one interface 2820-c, displayed on the computer's screen, although, it is coming from two different servers or two different URL's.

As presented, templates can be uploaded to the virtual server and be used by an e-mall, satellite e-mall, e-shop or web site for the purposed of presenting a single interface to a user at a single web browser location, although it may be fetched from multiple locations.

IV) File with Settings Uploading Method

A user uploaded file with settings contain parameters that are associated with a variable name or any other means for allowing its processing and the extraction of its parameters. For example, the file with settings may have the following: "background color=ffffff", in this case, once the paramenter 'ffffff' is extracted from the file with settings, the program will know that it represent a value to be used to set the web site or a web page's background color to white.

Now we'll discuss the uploading of file with settings that goes along with an interface. Its purpose it to allow an interface to have more than one appearance. It may have different background colors, different text colors, different text sizes, different table formats, etc.

FIG. 29 shows a file with settings 2900 being uploaded to a server with templates 2902 and at the server it is read and its contents included in a template 2904.

FIG. 29a shows the same file structure of FIG. 27 except two more files are present at templates folder 2984: ShopPage.stg 2980 (file with settings for template ShopPage.asp) and ShopCart.stg 2982 (file with settings for template ShopCart.asp).

Figure 30:
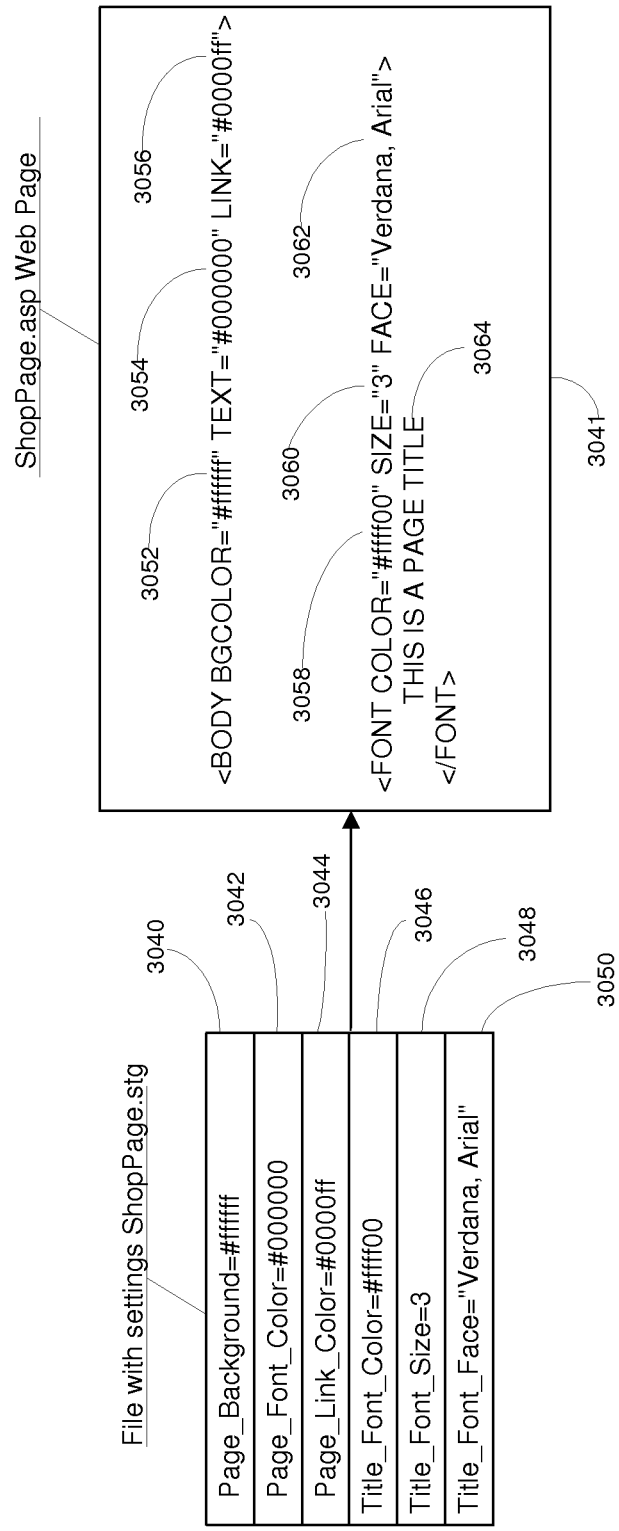
FIG. 30 illustrates a file with settings applied to a web page.

FIG. 30 shows a file with settings and its settings being used by a template file (ShopPage.asp) 3041. It has Page_Background=#ffffff 3040 it is the color white for the template's background (web page) and it is represented in the <BODY> tag as BGCOLOR="#ffffff" 3052. Also, Page_Font_Color=#000000 3042 is TEXT="#000000" 3054 (default black color for all text in the web page). The Page_Link_Color=#0000ff 3044 is the blue color used by the web page links and it is LINK="#0000ff" 3056.

There are three more settings and they are used for other purposes than changing the pages default colors. They are used to change text part of the web page created by the web server. Title_Font_Color=#ffff00 3046 is color="#ffff00" 3058 at the <FONT> tag and it is the color yellow. Title_Font_Size=3 3048 is SIZE="3" 3060 and Title_Font_Face="Verdana, Arial" 3050 is FACE="Verdana, Arial" 3062. The last three settings will make "THIS IS A PAGE TITLE" 3064 in yellow, with the font size of "3" and "Verdana" or "Arial" for the font type.

It is now clear that all that is needed for changing a web page template is to upload a file with settings with different settings and the web page will change its look accordingly. This method will allow a single template to be remotely programmed and have more than one look without changing the template or its content.

Functions necessary to read the file with settings, separate and place its settings in a memory array is not shown and is done as is for sake of simplicity. Also, the file with settings has just a few settings values, there can be any number and be used differently for the purpose of changing the interface appearance.

V) Satellite E-Malls

A satellite e-mall is very similar to an e-mall, except it is a loosen one by making. It has one or more e-services, also, there can have many satellite e-malls and each offering all kind of e-services and making them available to any e-mall or e-shop in the VNRI. It is up to an e-mall to include or exclude a satellite e-mall.

Once an e-mall includes one, the e-mall inherits its e-services and its behaviors as well. An e-mall with a satellite e-mall will be able to present the satellite e-mall's e-services along with its e-shops products and most of the cases it will be specialized e-services. For example: an e-mall includes a satellite e-mall that is specialized in car sales. Every time users access the e-mall and the satellite e-mall's e-service that is part of it. The e-mall e-commerce part may only display products that are related to cars in general.

Also, the e-service from a satellite e-mall has guiding means for guiding the e-mall in the displaying of its products along with the e-service. The guiding means may be an encoded information in a hidden field of a form or it may be words within the e-service page.

There are other means for presenting e-services to a satellite e-mall as well. And it is using e-services located in a different server than a server within the VNRI. The server will make its e-services available to VNRI and VNRI will make them available to a satellite e-mall. E-malls at VNRI are able to incorporate the satellite e-mall and its e-services by incorporating the satellite e-mall containing them.

As we've mentioned before, HTML is displayed on a computer screen as objects. Each e-service is one or more object and they can be text, image, form, links etc., and at least one object in the page will have at least one encoded information and the encoded information will be the guiding means for guiding the server to include at least one other object in the page and transmit it to a client.

As it has been presented so far. The virtual network has e-malls and e-malls has e-shops and web sites. Also, as we'll see, the virtual network has means for creating and maintaining satellite e-malls and make them available to all e-malls in the virtual network (pre-set satellite e-malls). Also, the same means for creating and maintaining satellite e-malls is available for each e-mall in the network (customized e-mall).

Satellite e-malls at the virtual network are specialized and e-malls use them as is and will not be able to make changes to them. On the other hand, a satellite e-mall created by the e-mall is customized and can be changed at will by the e-mall that created it.

A satellite e-mall is an e-mall where e-services and e-commerce can be offered simultaneously at the same web page and e-services will enhance the e-commerce counterpart. If a user at a web browser is viewing a satellite e-mall web page and he/she selects a link, drop down list or any other means at the e-service side. The e-commerce part will change as well to reflect the e-services.

E-services offered by a satellite e-mall can be of any kind: Auction, Car Sales, Realty, etc. Also, it can be of any kind of specialized web site: Sports, News, Weather etc.

The virtual network will have many e-services available to e-malls, satellite e-malls, e-shops, e-distributors and web sites. And any will be able to select and include web pages of e-services provided for by the virtual network. Each of these e-services web pages will be already translated into the foreign languages that are supported by the virtual network. These e-services web pages will permit customization process without having e-services of their own.

The e-commerce and the e-services may or may not reside at the same location. They can be at a single or multiple URL addresses, folders, databases or database tables.

Let us explore this concept a little further. Let us say that that an e-mall has some e-shops selling sporting goods, some others selling cars accessories and still others selling music CD's (let us call it: e-mall A). Now let us say that a satellite e-mall in the virtual network is specialized in offering car services (let us call it: satellite e-mall Car Sales). Besides its specialization in car services, this satellite e-mall will have departments related to cars, for instance, a department for car accessories.

Now, if the e-mall A includes the satellite e-mall Car Sales into its architecture. Every time a user access the satellite e-mall Car Sales he/she will be able to view all information about cars and also view all car accessories products from the e-mall A along with car accessories products from distributors/manufacturers.

The idea is to allow e-commerce and e-services to be displayed on a single web page although they come from two different locations. In the above example, the e-commerce comes from e-mall A and the e-services comes from the satellite e-mall Car Sales that is part of the virtual network and available to all e-malls in the virtual network system. The satellite e-mall will allow an e-mall to offer more specialized services than it could otherwise.

Figure 31:
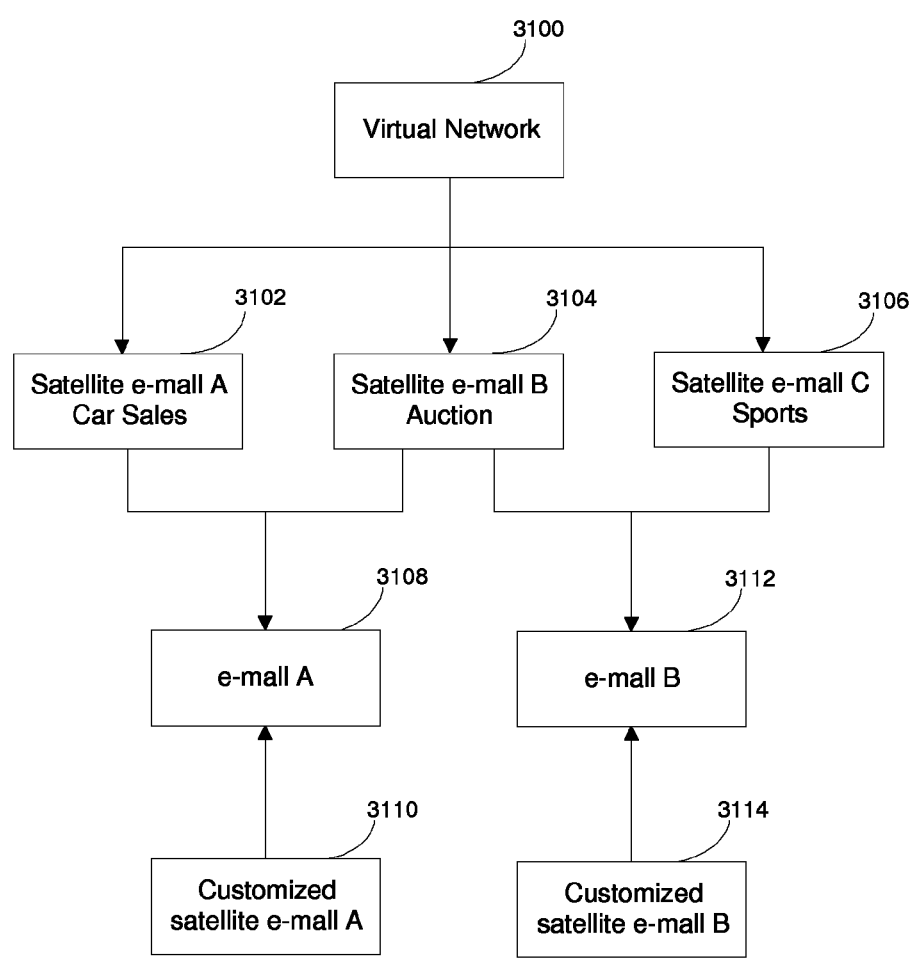
FIG. 31 illustrates virtual network's satellite e-malls and e-malls' satellite e-malls.

Now is time for us to delve a little further and discuss how the satellite e-mall will enhance the shopping experience in an e-mall FIG. 31 shows this arrangement, the virtual network 3100 has three satellite e-malls 3102, 3104 and 3106 and each of this satellite e-malls having distinct services. The satellite e-mall A 3102 specializes in Car Sales, satellite e-mall B 3104 specializes in Auction and satellite e-mall C 3106 specializes in Sports. Also, there are two e-malls: e-mall A 3108 and e-mall B 3112. Now each one will have more services and products for selling besides the ones that are available within their respective e-shops.

E-mall A 3108 now has Car Sales 3102 and Auction 3104. When a user views an Auction for a specific product (e-services) the drop down tree at the web page on the left (e-commerce) will be set accordingly to show the user that a similar product is also available in an e-store within the e-mall. The same is true for e-mall B 3112. It has a satellite e-mall B 3104 (Auction) and satellite e-mall C 3106 (Sports). Now e-mall B 3112 will have Auction and also sell Sports related products from its e-shops along with Sports related products from e-distributors/e-manufacturers.

Since the virtual network will host a variety of e-malls and they in turn will host a variety of e-shops. Any e-mall with a satellite e-mall Auction will offer to their e-shops means for placing their products in the auction and it will be available to every e-mall hosting the satellite e-mall Auction.

If we look just bellow e-mall A 3108 and e-mall B 3112, we'll see that each e-mall has a customized satellite e-mall. Customized satellite e-mall A 3110 for e-mall A 3108 and customized satellite e-mall B 3114 for e-mall B 3112.

The customized satellite e-mall is different than a satellite e-mall supplied by the virtual network. The e-mall creates and maintains a customized satellite e-mall and supplies its e-services or select one from the virtual network, also, selects departments for it's e-commerce. A customized satellite e-mall is unique to each e-mall while the satellite e-mall supplied by the virtual network is the same for any e-mall that offers its services.

Figure 31A:
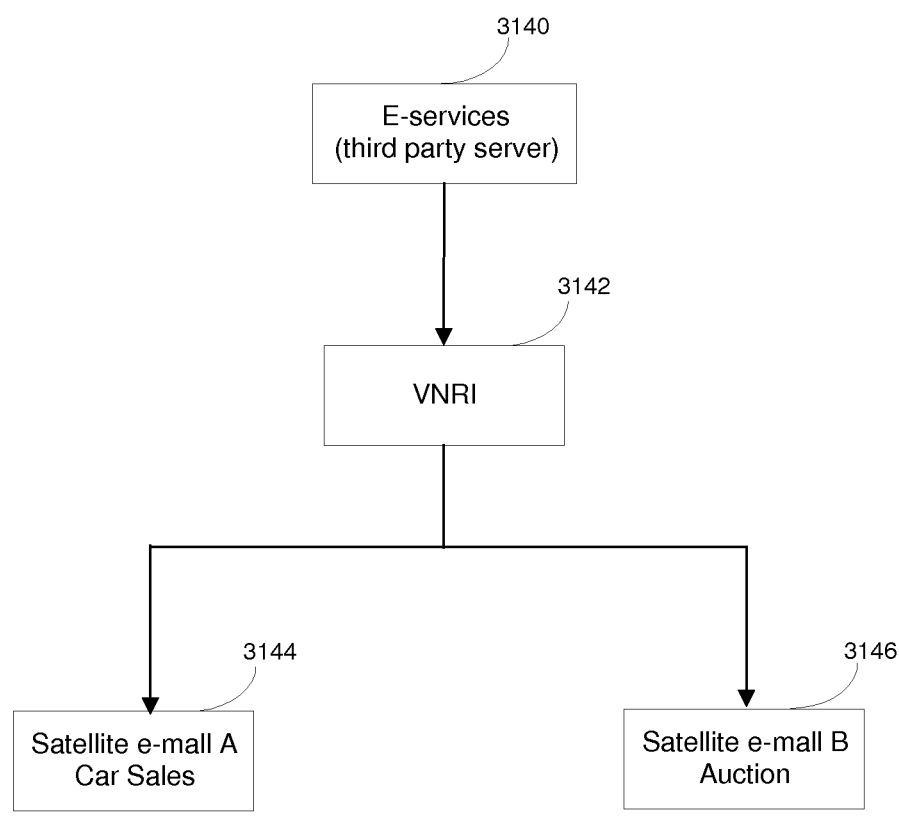
FIG. 31a illustrates satellite e-malls receiving e-services through the virtual network.
Figure 31B:
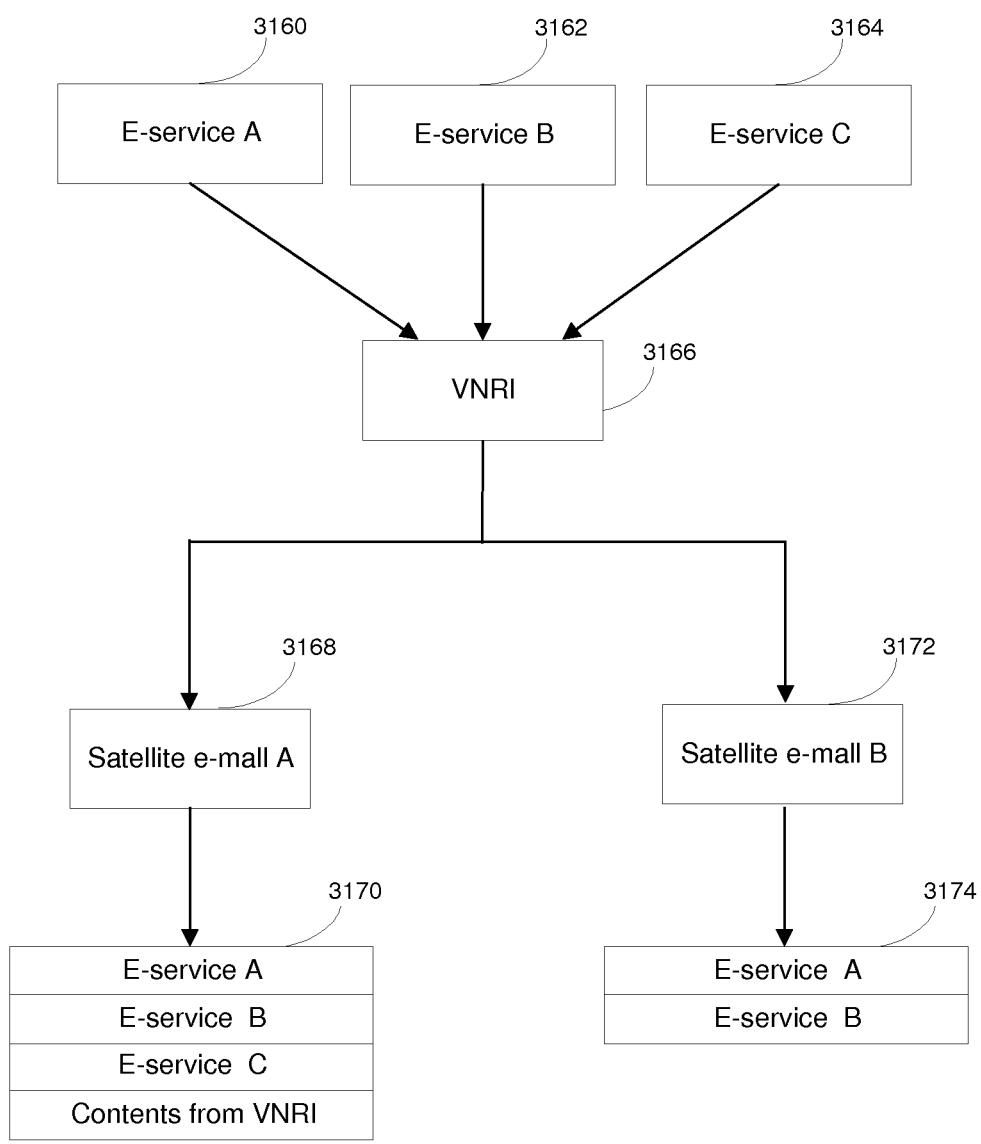
FIG. 31b illustrates two satellite e-malls receiving e-services through the virtual network from three different sources.

FIG. 31a and FIG. 31b are further overview of how e-services can be incorporated into a satellite e-mall through VRNI. E-services (contents) are received from third parties (servers) by the VNRI and made available to satellite e-malls as if the each e-services had been provided by the VNRI. Each e-service displayed on a client computer screen is one or more objects and they can be image, text, form, etc.

FIG. 31a shows e-services provided by third parties 3140 to VRNI 3142. As shown, Satellite e-mall A 3144 and Satellite e-mall B 3146 are receiving e-services available at VNRI 3142, although they are located at the third party web site 3140. Now that satellite e-malls have these e-services and after an e-mall incorporates any satellite e-mall, all e-services that are part of the satellite e-mall become part of the e-mall.

FIG. 31b shows another method of making e-services available to satellite e-malls. As shown, there are three e-services: E-service A 3160, E-service B 3162 and E-service C 3164 and all three are made available to VNRI 3166. Now VNRI 3166 will make all three e-services available to satellite e-malls. Satellite e-mall A 3168 has E-service A, E-service B, E-service C and contents from the VNRI (3170). Satellite e-mall B 3172 has E-service A and E-service B (3174). As it has been previously explained, once an e-mall incorporates either satellite e-mall A or satellite e-mall B, their e-services along with VNRI's contents (if any) will be part of the incorporating e-mal.

Once an e-service is displayed on a client computer it will be one or more objects and having means for its association with the VNRI's e-commerce or other e-services. Also, these e-services can be made available directly to a server through the VNRI infrastructure instead of being incorporated in a satellite e-mall or be displayed directly to a client computer without the user of a sever. In the latter case, the e-services displayed at the client will be fetched from the VNRI. Furthermore, e-services/contents can be retrieved from different server by another server (secondary server) and this secondary server will make any or all of these e-services available to one or more servers (tertiary servers) and each of the tertiary server will make these e-services available to a client.

Figure 32:
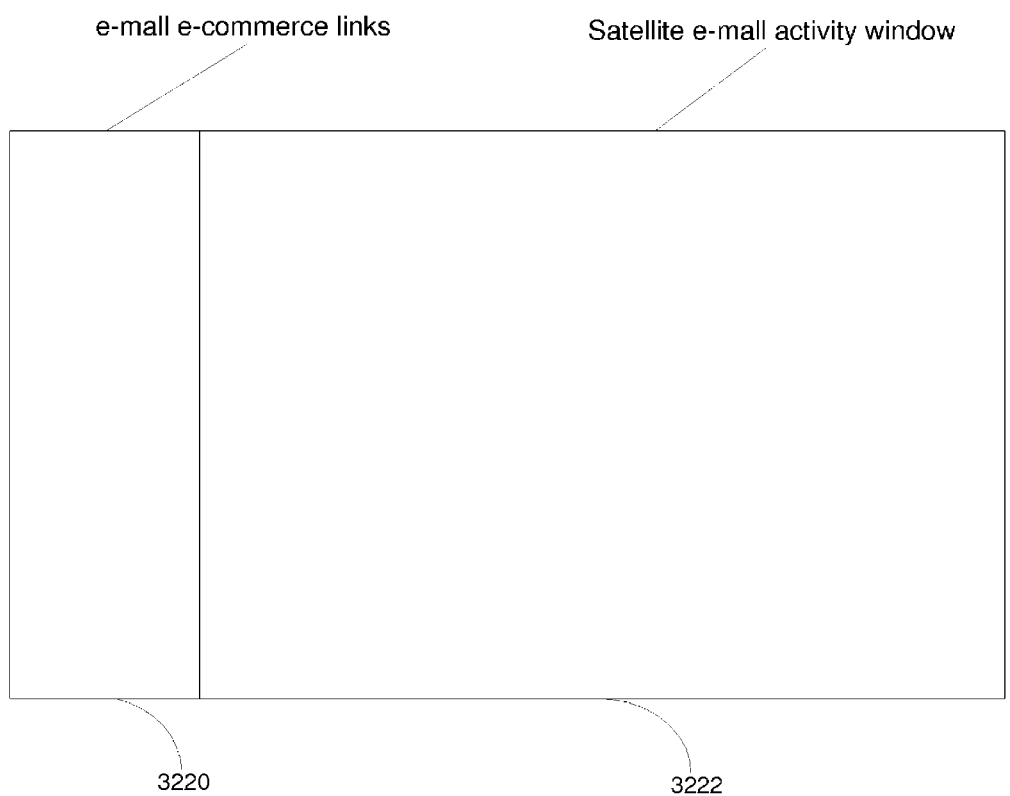
FIG. 32 illustrates a web page divided in two windows, one for e-commerce and the other for e-services.

FIG. 32 shows what we've discussed so far. On the left part of the web page 3220 is where the e-commerce part will be displayed and on the right part 3222 is for the e-services.

Figure 33:
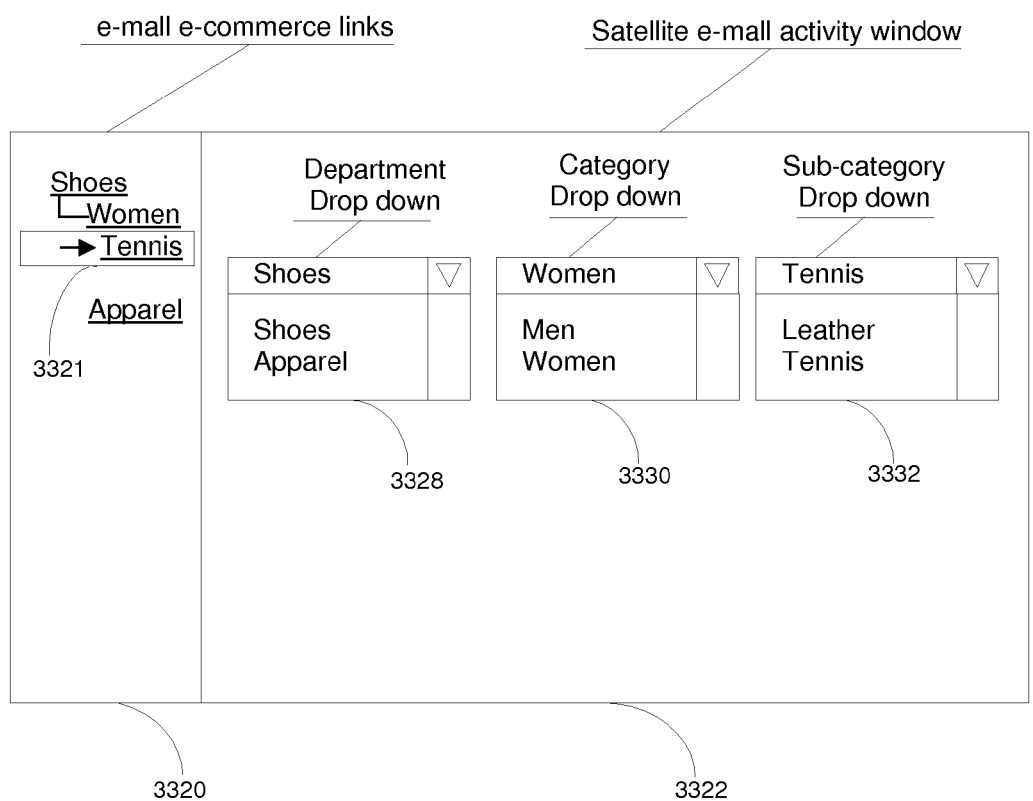
FIG. 33 illustrates the web page of FIG. 32 with e-commerce on the left and e-services on the right.

FIG. 33 shows a further embodiment of FIG. 32. On the left links 3320 has a tree drop down menu with Shoes and Apparel for the departments. The department Shoes has Women as category and the category Women has Tennis as a sub-category. On the right window 3322 (satellite e-mall activity window) has three drops downs: department 3328, category 3330 and sub-category 3332. At the top of each drop down there is the user choice for it. Shoes for department 3328, Women for category 3330 and Tennis for sub-category 3332. We're showing drop downs as means for the communication between the e-services 3322 and the commerce 3320.

Other means can be used as well, like, hidden form elements with department, category and sub-category codes encoded in them. Also, embedded information with key words at the e-service web page, or even, the use of the information at the web page as indexing key words that the server will use to search the e-mall's database and provide a list that match the words in the e-service web page.

In the case of customized e-services. It can have embedded information pertaining to the e-mall supplying the customized e-service, and, whenever the e-service is used virtually by another e-mall, satellite e-mall or web sited in the virtual network. Also, products from e-stores of the e-mall that is supplying the e-service will be available virtually at each one based on the embedded information at the e-service's web page.

Figure 34:
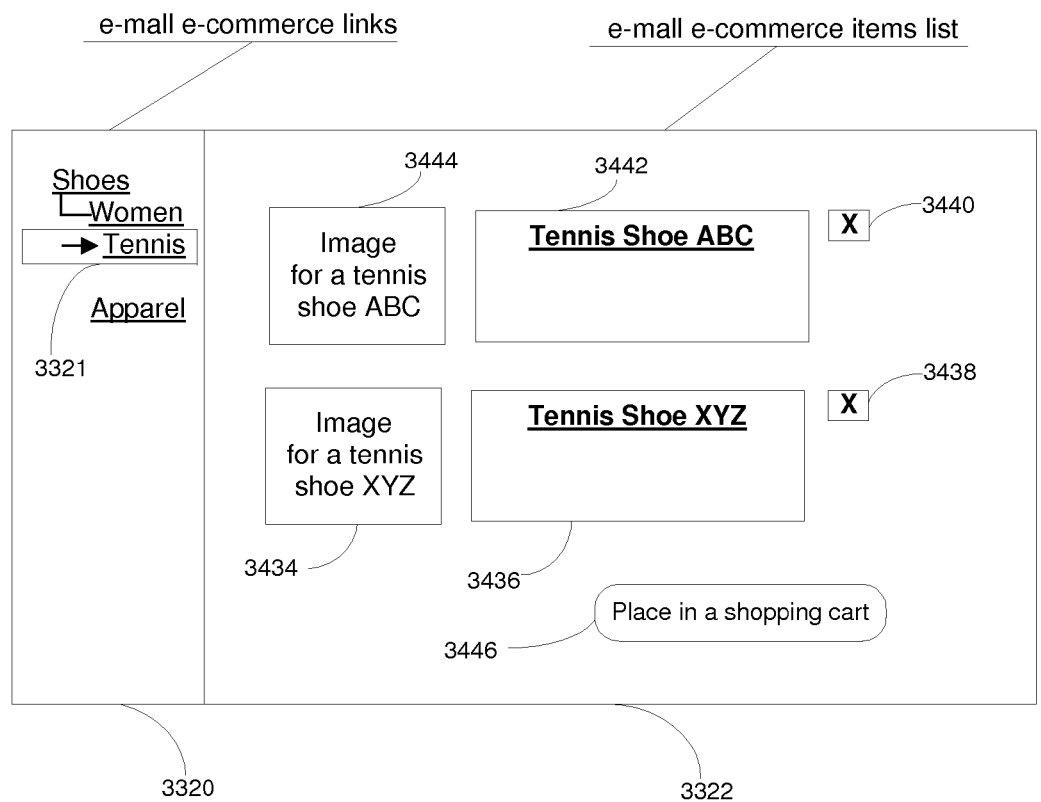
FIG. 34 illustrates a list of products for the chosen sub-category.

FIG. 34 is a further embodiment of FIG. 33. It shows a list of products displayed on the right window 3322 that is the user's selection (Tennis 3321) from the left window 3320. There are two products with respective images, titles with links and a check box. Tennis as the selected sub-category 3321 has product Tennis Shoe ABC (image 3444, title with a link 3442 and a check box 3440) and Tennis Shoe XYZ (image 3434, title with a link 3436 and a check box 3438). Also, a button 3446 is present on right window 3322 for the purpose of placing selected items in a shopping cart. In our example both items will be placed in the shopping cart, since they are both checked (check box 3440 and check box 3438).

VI) Surf User List

As we've seen so far, the virtual network comprising of e-malls, satellite e-malls, e-shops, e-distributors/e-manufacturers and web sites. Also, an e-shop from one e-mall can sell virtually in another e-mall. As we see, a web browser user accessing an e-mall in the virtual network will come across web pages from different e-shops dynamically located at the e-mall, web pages from virtual e-shops (e-shops dynamically located at a different e-mall) and also from e-distributors/e-manufacturers.

Lets say that the web browser user later return to the e-mall and want to find a product that he/she saw on a previous visit. Lets also say that the product was from a virtual e-shop and it is no longer available virtually at the e-mall. The user will think that the item is no longer available because the e-shop is no longer virtually located at the e-mall. From this scenario it is clear that there is a need for a mechanism to track and keep the user surfing experience.

Each page of information supplied to each client have a surf code reference and it is used for automatically storing a reference for each information supplied to each client and it forms the surf user-list. Once the user requests his/her surf user-list, the server will use each surf code reference and create the surf user-list and sent it to the user. A surf user-list will only include information that was previously viewed by the user.

Also, an end-user at a client with a login means and after logging on the server, he/she will be able to request the server to save his/her surf user-list for later review. The server will save the surf user-list based on the end-user ID that is part of the login information in the server.

Figure 35:
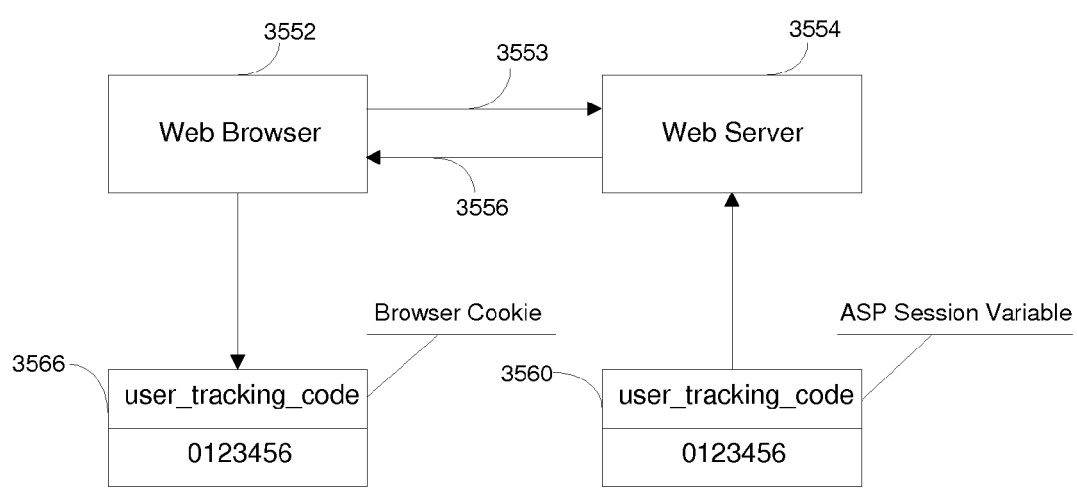
FIG. 35 illustrates a method of user tracking between a web server and a web browser.

FIG. 35 shows the communication that takes place between a web server and a web browser, when the web browser accesses the web server for the first time. The web browser 3552 initiates communication 3553 with the web server 3554. The web server 3554 generates a tracking number 3560 and send it 3556 to the web browser 3552, now the web browser 3552 will store it in a cookie 3566. This process will allow the web server 3554 to keep track of the web browser that is accessing it. We're showing the ASP technology but it can be implemented by other technologies as well.

Figure 36:
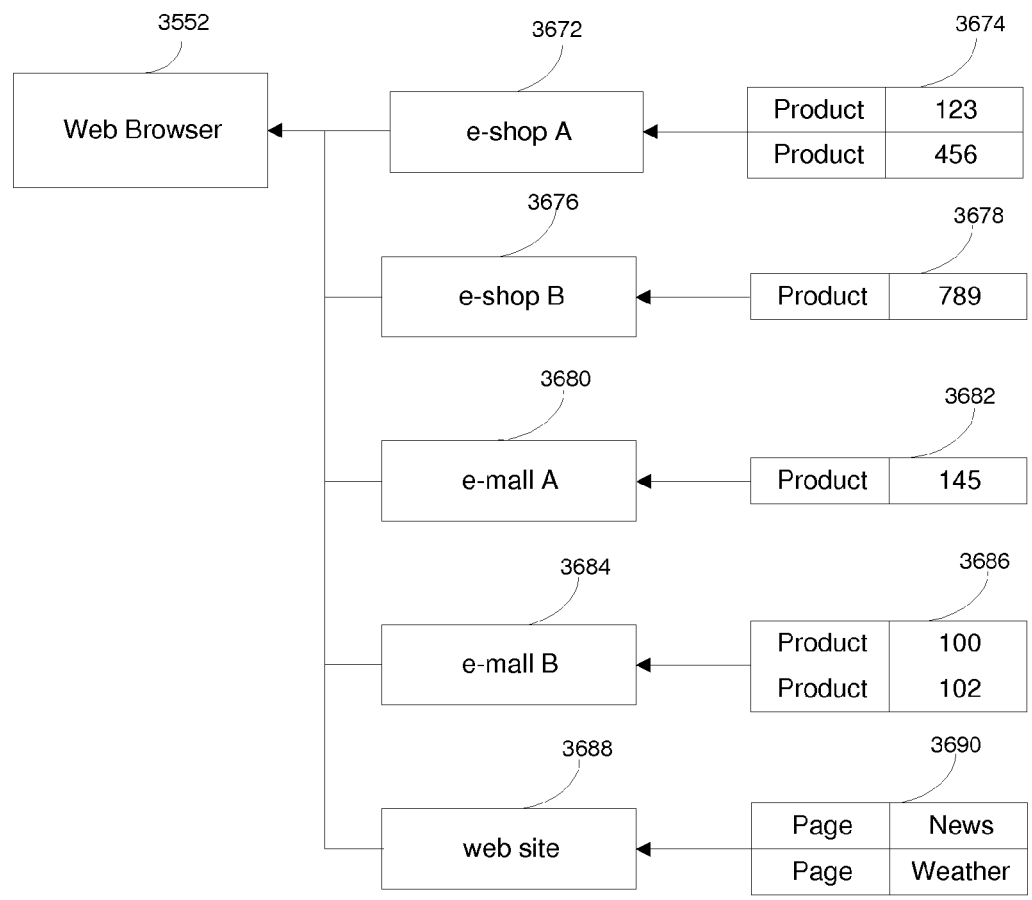
FIG. 36 illustrates a web browser's user viewing web pages from multiple web sites and e-shops.

FIG. 36 shows a web browser 3552 accessing web pages from: e-malls, e-stores and web sites. Web browser 3552 fetches web pages from each one of them. From e-shop A 3672 end-user at the web browser 3552—view products 123 and 456 (3674). From e-shop B 3676 will view product 789 (3678). From e-mail A 3680—view product 145 (3682). From e-mail B 3684—view products 100 and 102 (3686) and from web site 3688 views web pages News and Weather (3690).

Figure 37:
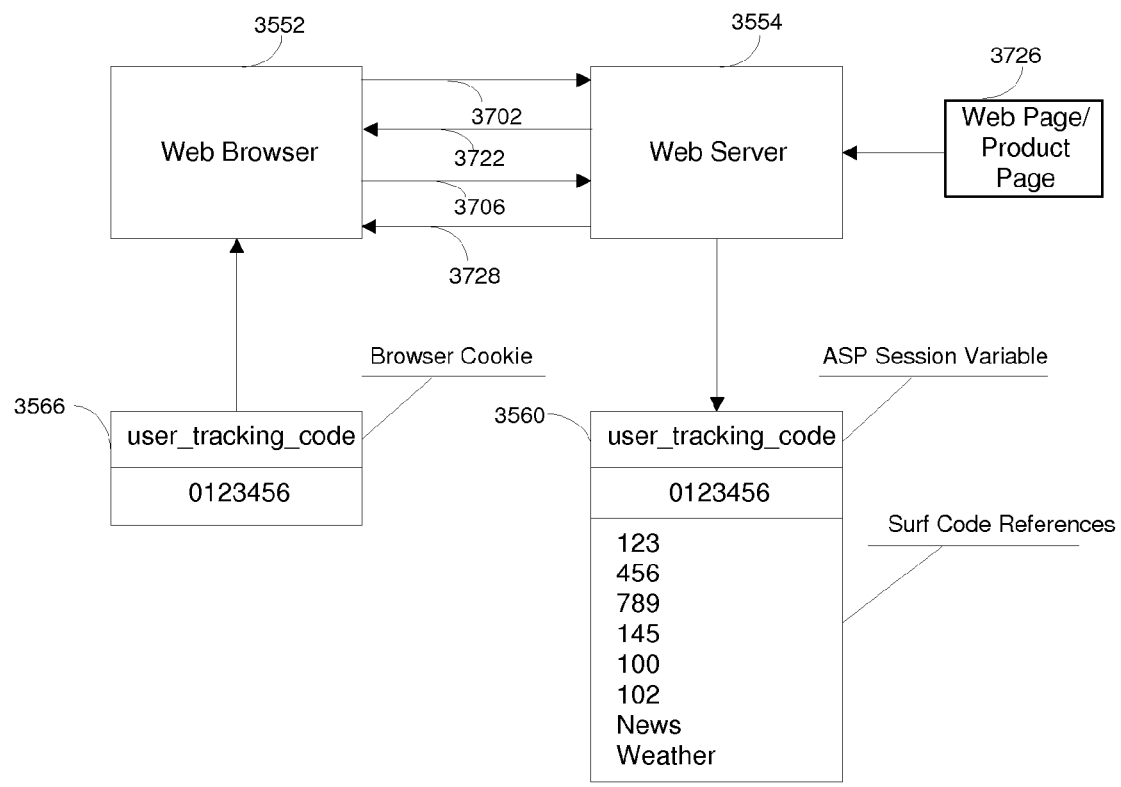
FIG. 37 illustrates a method of a web server tracking user surfing experience.

FIG. 37 shows the process that takes place at each request. The web browser 3552 sends a request 3702 to the web server 3554, the web server 3554 send a request for cookie called user_tracking_code 3722 to the web browser 3552. Now the web browser 3552 will retrieve the value "0123656" from the cookie user_tracking_code 3566 and send it 3706 to the server 3554. The web server 3554 will first save the requested web page or the product page's code in the session variable user_tracking_code 3560 and second it will fetch the web page or the product's page 3726 and sent it 3728 to the web browser 3552.

Figure 38:
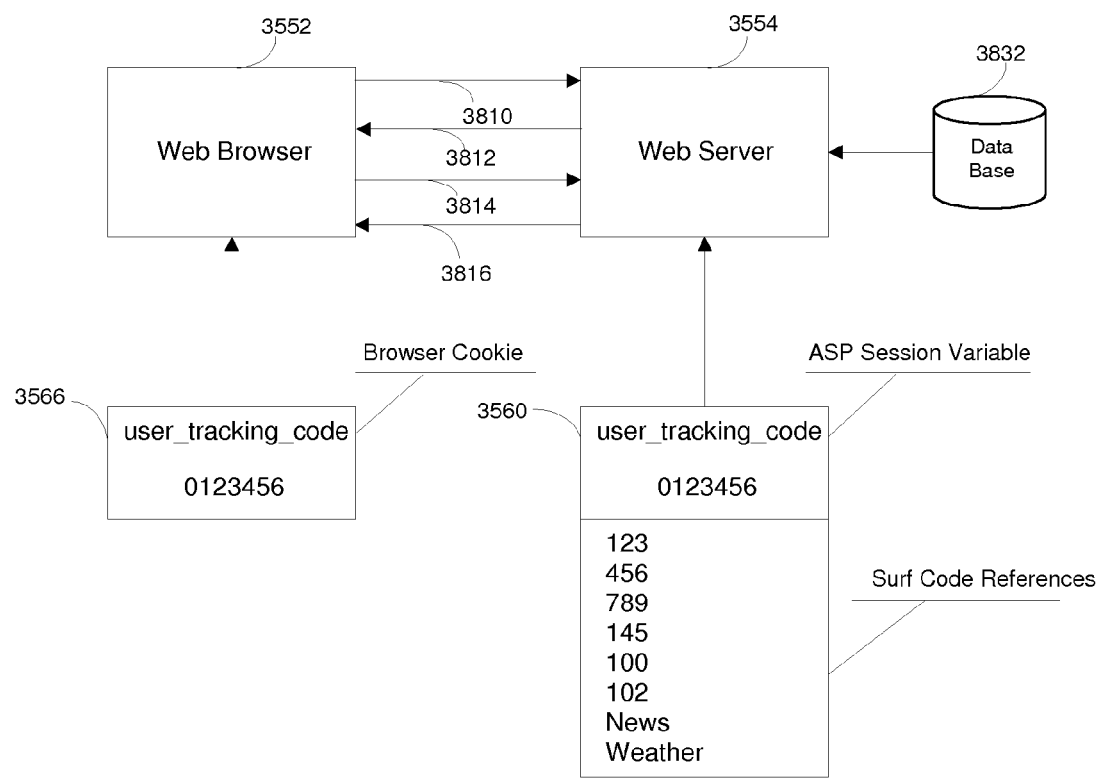
FIG. 38 illustrates a method of a web server presenting user's surf list for review.

FIG. 38 shows the process that takes place once a user at the web browser 3552 requests to view his/her surf list 3560. The web browser 3552 sends a request 3810 to the web server 3554. The web server 3554 will send a request 3812 to the web browser 3552 for the value of the cookie user_tracking_code 3566 and the web browser 3552 will fetch the value "0123656" from it and send 3814 to the web server 3554. The web server 3554 will fetch the values that are stored in the session variable user_tracking_code 3560. Next, the web server 3554 uses the list just retrieved from the session variable 3560 and searches the database 3832. And finally, it will fetch web pages and/or product's page that correspond to the values in the session variable 3560 and sent the page to the web browser 3552 through connection 3816.

Figure 39:
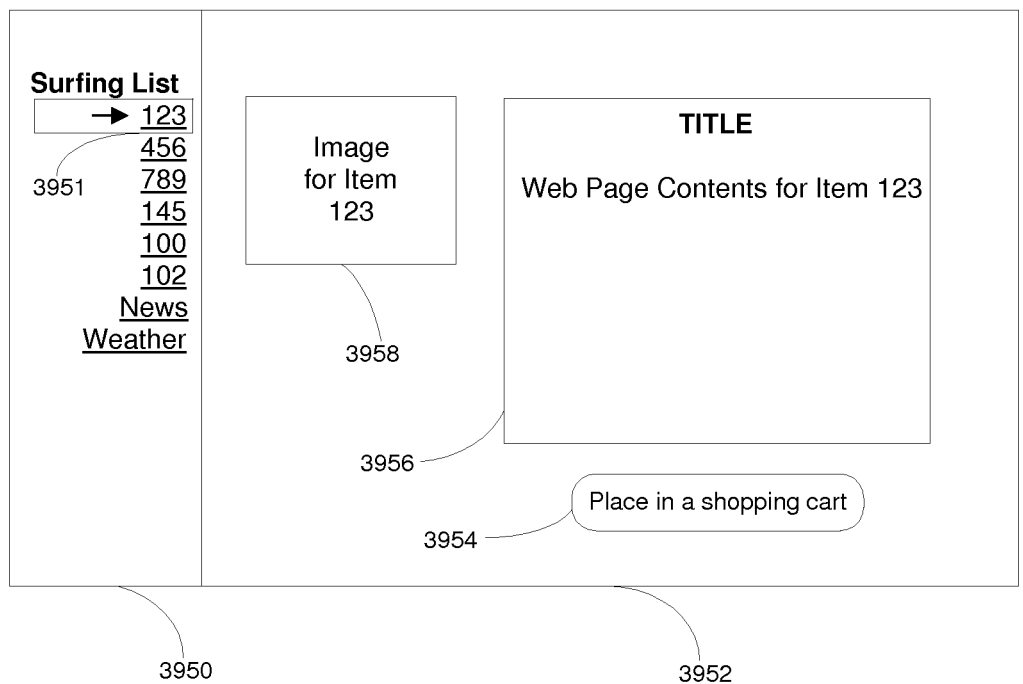
FIG. 39 illustrates a user reviewing web pages from his/her surf list.

FIG. 39 shows a web page with links on the left 3950 and they are links for the user surf list. They are the same ones that are stored in the session variable user_tracking_code 3560 (FIG. 38). On the right 3952 we see a page that the user has just selected from his/her surfing list 3950. And the selection was 123 (3951) and its contents are now displayed on the right 3952 and they are the item's image 3958, the item's title and description 3956 and also a button 3954 to place it in a shopping cart. Once again, a very basic web page was shown for sake of simplicity.

We've shown values stored in a session variable user_tracking_code 3560 (FIG. 38). It can be stored in a database as well for the purposed of tracking and recording the user activity and always have his/her surf list available.

VII) Customized Web Sites

Besides the user surfing tracking system, the virtual network will also have means for customizing web sites to each user. Once a user is registered, personal information and personal preferences will be used as to allow the virtual network to customize web sites to each user as to reflect the user's preferences and also the user's location.

There will be a plurality of information about a specific subject matter and upon a user access the server it will customize a web site. A customized web site will allow a server means for presenting different information about the same subject matter tailored uniquely to each user based on each user's pre-set information store in the server.

A user furnishes information to a server and once the same user returns to the server and log in, the server will only supply information to the user that is relevant to the user and based on the user pre-set information that is stored in the server.

Let's say that user has Soccer and Football for sports preferences and the local of residency is San Francisco, Calif., USA. Another one residing in Salvador, Bahia, Brazil has Soccer and Basketball for sports preferences. Now, both users will access the same web site at the same time and view sports. The user residing in San Francisco, Calif., USA will view information for Soccer and Football for leagues from San Francisco, Calif. and USA, while the second user will view sports information for leagues from Salvador, Bahia and Brazil.

The same method can be used to set user previous visited web pages or products page. For instance, a user visits a product page about fishing. Next time he/she come to any web site within VNRI with e-services, fishing related information will be part of the web site along with fishing products (e-commerce part).

It is to be understood that all e-commerce (goods/products) and e-services (articles/services) within the virtual network are available to all e-malls, satellite e-malls, e-shops, e-distributors and web sites virtually. Also, means will be available as to allow each e-mall to make its customized e-service(s) available to others e-malls, satellite e-malls, e-shops, e-distributors and web sites at the virtual network.

Many more arrangements can be created and incorporated in this invention. While it has been fully described in connection with the illustrated embodiments, it will be appreciated and understood that modifications may be made without departing from the true spirit and scope of the invention. We've used the term e-malls and e-shops all along but instead of e-mall, it can be called e-portal and instead of e-shops, it can be a combination of e-shops and e-services. Furthermore, this invention will allow the creation of a worldwide virtual environment.

What is claimed is:

1. A method of content presentation in a network comprising the display of virtual content by a server computer, the server computer comprising non-transitory memory storage medium having a computer readable program code embodied therein, said computer readable program code adapted to be executed to implement a method, the method comprising the steps of:
   the server hosting a plurality of content hosts on the network, the plurality of content hosts comprising: a first content host, a second content host, and an incorporating content host;
   wherein the second content host comprises a content;
      enabling the first content host:
         to be displayed on the incorporating content host; and
         when so displayed on the incorporating content host, to present the content as virtual content to a user accessing the first content host on the incorporating content host;
   and
   enabling presentation of the content to a user accessing the first content host on the incorporating content host.

2. The method of claim 1, further comprising the step of enabling a user of the network to provide the second content host and the content to the incorporating content host.

3. The method of claim 1, wherein the incorporating content host is an e-mall.

4. The method of claim 1, wherein the content comprises ecommerce selected from the group consisting of goods and services.

5. The method of claim 1, wherein the content is retrieved from the second content host by the incorporating content host.

6. The method of claim 1, wherein the second content host and the incorporating content host are located at two distinct network addresses.

7. The method of claim 1, further comprising the step of enabling the incorporating content host to register the first content host.

* * * * *